(12) United States Patent
Zhang et al.

(10) Patent No.: US 11,078,021 B2
(45) Date of Patent: Aug. 3, 2021

(54) STEEL BELT CONVEYING APPARATUS FOR TRANSPORTING AND BOLTING MACHINE AND TRANSPORTING AND BOLTING MACHINE

(71) Applicant: CHINA UNIVERSITY OF MINING AND TECHNOLOGY, Jiangsu (CN)

(72) Inventors: Nong Zhang, Jiangsu (CN);
Zhengzheng Xie, Jiangsu (CN);
Junyao Zhou, Jiangsu (CN); Qun Wei, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 0 days.

(21) Appl. No.: 17/057,112

(22) PCT Filed: Oct. 29, 2018

(86) PCT No.: PCT/CN2018/112389
§ 371 (c)(1),
(2) Date: Nov. 20, 2020

(87) PCT Pub. No.: WO2020/052015
PCT Pub. Date: Mar. 19, 2020

(65) Prior Publication Data
US 2021/0198046 A1 Jul. 1, 2021

(30) Foreign Application Priority Data
Sep. 11, 2018 (CN) .......................... 201811058805.6

(51) Int. Cl.
*B65G 15/48* (2006.01)
*B65G 15/30* (2006.01)
(Continued)

(52) U.S. Cl.
CPC ........... *B65G 15/48* (2013.01); *B65G 41/006* (2013.01)

(58) Field of Classification Search
None
See application file for complete search history.

(56) References Cited

U.S. PATENT DOCUMENTS

| 830,669 A | * | 9/1906 | Menard | ................. | B65G 21/14 |
| | | | | | 198/834 |
| 3,572,496 A | * | 3/1971 | Cutts | ..................... | B65G 21/14 |
| | | | | | 198/861.2 |

(Continued)

FOREIGN PATENT DOCUMENTS

| CN | 201149262 | 11/2008 |
| CN | 103174448 | 6/2013 |

(Continued)

OTHER PUBLICATIONS

"International Search Report (Form PCT/ISA/210) of PCT/CN2018/112389", dated Jun. 11, 2019, with English translation thereof, pp. 1-6.

*Primary Examiner* — Kavel Singh
(74) *Attorney, Agent, or Firm* — JCIP Global Inc.

(57) ABSTRACT

A steel belt conveying apparatus includes upper and lower horizontal conveying portions, left and right inclined conveying chains, a connecting rod frame, an inclined frame, a drive portion, and a height adjustment cylinder. The left inclined conveying chain is separately connected to the upper and lower horizontal conveying portions. The right inclined conveying chain is separately connected to the upper and lower horizontal conveying portions. A top portion of the connecting rod frame is hingedly connected to an upper horizontal frame of the upper horizontal conveying portion. A bottom portion is hingedly connected to a lower frame of the lower horizontal conveying portion. A top (Continued)

portion of the inclined frame is hingedly connected to an upper horizontal drive shaft of the upper horizontal conveying portion, and a bottom portion is hingedly connected to a lower horizontal drive shaft of the lower horizontal conveying portion.

10 Claims, 14 Drawing Sheets

(51) Int. Cl.
    *B65G 15/60*     (2006.01)
    *B65G 41/00*     (2006.01)

(56) References Cited

U.S. PATENT DOCUMENTS 8,869,972 B2 * 10/2014 Shah .................... E02F 3/6481
                                                           198/714
9,334,896 B2 * 5/2016 Braun ...................... F16C 3/02

FOREIGN PATENT DOCUMENTS

| CN | 203044729 | 7/2013 |
| CN | 105626108 | 6/2016 |
| CN | 105971628 | 9/2016 |
| CN | 206071622 | 4/2017 |
| CN | 206187833 | 5/2017 |
| CN | 107697562 | 2/2018 |
| JP | 2000213288 | 8/2000 |

* cited by examiner

STEEL BELT CONVEYING APPARATUS FOR TRANSPORTING AND BOLTING MACHINE AND TRANSPORTING AND BOLTING MACHINE

CROSS-REFERENCE TO RELATED APPLICATION

This application is a 371 of international application of PCT application serial No. PCT/CN2018/112389, filed on Oct. 29, 2018, which claims the priority benefit of China application No. 201811058805.6, filed on Sep. 11, 2018. The entirety of each of the above mentioned patent applications is hereby incorporated by reference herein and made a part of this specification.

BACKGROUND

Technical Field

The present invention relates to a transporting and bolting machine, and specifically, to a steel belt conveying apparatus for a transporting and bolting machine and a transporting and bolting machine, which is particularly suitable for roadway tunneling with simple geological conditions, a small coal seam inclination angle, and good roof stability.

Description of Related Art

Anchor bolt support and protection has many advantages such as safety, flexibility, and high efficiency, and is a support and protection method widely applied in coal mine roadways in China. Steel belts are important components in anchor bolt support and protection systems, and play a key role in improving overall effects of support and protection of anchor bolts and maintaining the integrity of surrounding rocks. The roles are mainly reflected in the following aspects. Pre-stressing force and working resistance diffusion of the anchor bolts, supporting and protecting a surface of a roadway and improving a stress state of a surrounding rock, balancing a force of the anchor bolt and improving an overall supporting and protection effect. According to different structures, the steel belts can be classified into a flat steel belt, a W-shaped steel belt, an M-shaped steel belt, and the like. A weight per unit length can reach 4 kg/m to 8 kg/m. A weight of a single steel belt used for an anchor bolt for a roof can reach tens of kilograms. Mechanization of construction of steel belts has always been difficult to implement. In most cases, the steel belts are manually handled, lifted, and mounted, leading to problems such as high labor intensity and low working efficiency. This is one of constraints of mechanization, automation, and intelligence in tunneling.

SUMMARY

In terms of disadvantages in the prior art, a technical problem to be resolved by the present invention is to provide a steel belt conveying apparatus for a transporting and bolting and a transporting and bolting machine. The steel belt conveying apparatus for the transporting and bolting machine and the transporting and bolting machine use a chain structure to transport a steel belt to a position of a roadway roof to be constructed, thereby reducing manual handling, lifting, and installation, reducing labor intensity of steel belt installation, and improving a mechanization level and safety of support and protection of an anchor bolt.

To implement the foregoing technical objective, a technical solution used in the present invention is as follows.

A steel belt conveying apparatus for a transporting and bolting machine includes an upper horizontal conveying portion, a left inclined conveying chain, a right inclined conveying chain, a lower horizontal conveying portion, a connecting rod frame, an inclined frame, a drive portion, and a height adjustment cylinder. The upper horizontal conveying portion includes an upper horizontal direction changing shaft, an upper horizontal left direction changing wheel, an upper horizontal right direction changing wheel, an upper horizontal left chain, an upper horizontal right chain, an upper horizontal frame, an upper horizontal left drive double-chain wheel, an upper horizontal right drive double-chain wheel, an upper horizontal drive shaft, and an upper horizontal drive chain wheel. One side of the upper horizontal frame is hingedly connected to the upper horizontal drive shaft, a left end of the upper horizontal drive shaft is fixedly connected to the upper horizontal left drive double-chain wheel, and a right end is fixedly connected to the upper horizontal right drive double-chain wheel. The other side of the upper horizontal frame is horizontally and slidably connected to the upper horizontal direction changing shaft. A left end of the upper horizontal direction changing shaft is hingedly connected to the upper horizontal left direction changing wheel, and a right end of the upper horizontal direction changing shaft is hingedly connected to the upper horizontal right direction changing wheel. Both the upper horizontal left direction changing wheel and the upper horizontal left drive double-chain wheel are meshed with the upper horizontal left chain, and both the upper horizontal right direction changing wheel and the upper horizontal right drive double-chain wheel are meshed with the upper horizontal right chain. An intermediate portion of the upper horizontal drive shaft is fixedly connected to the upper horizontal drive chain wheel. The lower horizontal conveying portion includes a lower frame, a lower horizontal left chain, a lower horizontal right chain, a lower horizontal drive shaft, a lower horizontal left drive double-chain wheel, a lower horizontal right drive double-chain wheel, a lower horizontal left direction changing chain wheel, a lower horizontal right direction changing chain wheel, and a lower horizontal direction changing shaft. One side of the lower frame is hingedly connected to the lower horizontal drive shaft. A left end of the lower horizontal drive shaft is fixedly connected to the lower horizontal left drive double-chain wheel, and a right end of the lower horizontal drive shaft is fixedly connected to the lower horizontal right drive double-chain wheel. The other side of the lower frame is horizontally and slidably connected to the lower horizontal direction changing shaft. A left end of the lower horizontal direction changing shaft is hingedly connected to the lower horizontal left direction changing chain wheel, and a right end of the lower horizontal direction changing shaft is hingedly connected to the lower horizontal right direction changing chain wheel. Both the lower horizontal left drive double-chain wheel and the lower horizontal left direction changing chain wheel are meshed with the lower horizontal left chain, and both the lower horizontal right drive double-chain wheel and the lower horizontal right direction changing chain wheel are meshed with the lower horizontal right chain. The left inclined conveying chain is separately meshed with the upper horizontal left drive double-chain wheel and the lower horizontal left drive double-chain wheel, the right inclined conveying chain is separately meshed with the upper horizontal right drive double-chain wheel and the lower horizontal right drive double-chain wheel. A top portion of the connecting rod frame is hingedly connected to the upper horizontal frame, and a bottom portion is hingedly connected to the lower frame. A top portion of the inclined frame is hingedly connected to the upper horizontal drive shaft, and a bottom portion of the inclined frame is hingedly connected to the lower horizontal drive shaft. The drive portion is fixed on the inclined frame and the drive portion is connected to the upper horizontal drive chain wheel. A cylinder tail of the height adjustment cylinder is hingedly connected to the inclined frame, a piston rod is hingedly connected to the connecting rod frame, and the lower frame is fixed on the transporting and bolting machine.

In a further improved technical solution of the present invention, the upper horizontal frame includes an upper horizontal frame left longitudinal tube, an upper horizontal frame right longitudinal tube, an upper horizontal frame front horizontal tube, and an upper horizontal frame rear horizontal tube. Both a left end of the upper horizontal frame front horizontal tube and a left end of the upper horizontal frame rear horizontal tube are vertically connected to a side surface of the upper horizontal frame left longitudinal tube. Both a right end of the upper horizontal frame front horizontal tube and a right end of the upper horizontal frame rear horizontal tube are vertically connected to a side surface of the upper horizontal frame right longitudinal tube. A front end of the upper horizontal frame left longitudinal tube is provided with an upper horizontal rack left front fork, and a rear end of the upper horizontal frame left longitudinal tube is provided with an upper horizontal rear left lug. A front end of the upper horizontal frame right longitudinal tube is provided with an upper horizontal rack right front fork, and a rear end of the upper horizontal frame right longitudinal tube is provided with an upper horizontal rear right lug. The upper horizontal drive shaft passes through the upper horizontal rear left lug and the upper horizontal rear right lug and is separately hingedly connected to the upper horizontal rear left lug and the upper horizontal rear right lug. An upper horizontal frame hinge lug is disposed on a rear side surface of the upper horizontal frame rear horizontal tube and is hingedly connected to the top portion of the connecting rod frame, an upper horizontal L-shaped limiting plate is disposed on a front side surface of the upper horizontal frame front horizontal tube, two upper horizontal direction changing shaft notches are provided on the surface of the upper horizontal direction changing shaft and are horizontally and slidably connected to the upper horizontal rack left front fork and the upper horizontal rack right front fork respectively, an upper chain spiral tensioning structure is disposed between the upper horizontal frame front horizontal tube and the upper horizontal direction changing shaft, and a scale is disposed on a side surface of the upper horizontal frame left longitudinal tube.

In a further improved technical solution of the present invention, the upper horizontal frame front horizontal tube is provided with an upper horizontal tensioning installation hole, an upper horizontal direction changing shaft ring-shaped groove is provided on the surface of the upper horizontal direction changing shaft. The upper chain spiral tensioning structure includes a tensioning fork and a tensioning screw. A circle of a blocking protrusion is disposed on a surface of the tensioning screw and a tensioning screw tail cube is disposed at a tail end. The tail end of the tensioning screw is inserted into and passes through the upper horizontal tensioning installation hole, and the blocking protrusion blocks the tensioning screw from continuing passing through. A front end of the tensioning screw is threadedly connected to a tail end of the tensioning fork, a front end of the tensioning fork is inserted into the upper horizontal direction changing shaft ring-shaped groove, and the upper chain spiral tensioning structure is configured to implement tensioning of the upper horizontal left chain and the upper horizontal right chain.

In a further improved technical solution of the present invention, the lower frame includes a lower frame front longitudinal tube, a lower frame front beam, a lower frame rear beam, a lower frame left longitudinal beam, and a lower frame right longitudinal beam. Both a left end of the lower frame front beam and a left end of the lower frame rear beam are vertically connected to a side surface of the lower frame left longitudinal beam. Both a right end of the lower frame front beam and a right end of the lower frame rear beam are vertically connected to a side surface of the lower frame right longitudinal beam. A lower frame front lug is disposed at each of a front end of the lower frame left longitudinal beam and a front end of the lower frame right longitudinal beam. A lower frame rear slot seat is disposed at each of a rear end of the lower frame left longitudinal beam and a rear end of the lower frame right longitudinal beam. The lower frame front longitudinal tube is fixedly connected to a front side surface of the lower frame front beam. A front longitudinal tube hole is provided on the lower frame front longitudinal tube, and the front longitudinal tube hole and a hole of the lower frame front lug are in a same vertical direction. A front longitudinal single lug is disposed at a front end of the lower frame front longitudinal tube. The lower horizontal drive shaft passes through the front longitudinal tube hole and the lower frame front lug, and the lower horizontal drive shaft is separately hingedly connected to the lower frame front longitudinal tube and the lower frame front lug. A front longitudinal single lug is hingedly connected to a bottom portion of the connecting rod frame. Two lower horizontal direction changing shaft notches are provided on the surface of the lower horizontal direction changing shaft and are horizontally and slidably connected to the lower frame rear slot seat separately. A lower chain spiral tensioning structure is disposed between the lower frame rear beam and the lower horizontal direction changing shaft. A lower frame tensioning installation hole is provided on a surface of the lower frame rear beam, and a lower horizontal direction changing shaft ring-shaped groove is provided on the surface of the lower horizontal direction changing shaft. A structure of the lower chain spiral tensioning structure is the same as a structure of the upper chain spiral tensioning structure. A tail end of the lower chain spiral tensioning structure is inserted into the lower frame tensioning installation hole, and a front end of the lower chain spiral tensioning structure is inserted into the lower horizontal direction changing shaft ring-shaped groove. The lower chain spiral tensioning structure is configured to implement tensioning of the lower horizontal left chain and the lower horizontal right chain, each of the lower frame left longitudinal beam and the lower frame right longitudinal beam is connected to a seat by using a support rack, and the seat is fixed on the transporting and bolting machine.

In a further improved technical solution of the present invention, the connecting rod frame includes three horizontal rods and two vertical rods. The three horizontal rods and the two vertical rods are mutually combined to form a ladder shape. A connecting rod frame upper lug is disposed at an upper end of each of the two vertical rods of the connecting rod frame, and a connecting rod frame lower lug is disposed at a lower end of each of the two vertical rods of the connecting rod frame. A connecting rod frame intermediate lug is disposed on a lower side surface of the horizontal rod in the middle of the connecting rod frame. There are two upper horizontal frame hinge lugs, and the connecting rod frame upper lug is hingedly connected to the upper horizontal frame hinge lug. There are two lower frame front longitudinal tubes, the connecting rod frame lower lug is hingedly connected to the front longitudinal single lug at the front end of the lower frame front longitudinal tube, and the connecting rod frame intermediate lug is hingedly connected to the piston rod of the height adjustment cylinder.

In a further improved technical solution of the present invention, the inclined frame includes a left vertical rod and a right vertical rod. A lower horizontal rod and an upper horizontal rod are vertically connected between the left vertical rod and the right vertical rod. The lower horizontal rod is located at a lower middle portion of the left vertical rod and the right vertical rod, and the upper horizontal rod is located at a upper middle portion of the left vertical rod and the right vertical rod. An inclined frame upper opening is provided at each of upper ends of the left vertical rod and the right vertical rod, and an inclined frame lower opening is provided at each of lower ends of the left vertical rod and the right vertical rod. The inclined frame upper opening is sleeved on the upper horizontal drive shaft and is hingedly connected to the upper horizontal drive shaft, and the inclined frame lower opening is sleeved on the lower horizontal drive shaft and is hingedly connected to the lower horizontal drive shaft. An inclined frame cylinder lug is disposed on an upper side surface of the lower horizontal rod and is hingedly connected to the cylinder tail of the height adjustment cylinder. An inclined frame left half ring and an inclined frame left tensioning lug are disposed on a back surface of the left vertical rod. The inclined frame left half ring is located above the inclined frame left tensioning lug. An inclined frame right half ring and an inclined frame right tensioning lug are disposed on a back surface of the right vertical rod. The inclined frame right half ring is located above the inclined frame right tensioning lug, and the inclined frame left half ring and the inclined frame left tensioning lug are connected to a left spring compressed chain tensioning apparatus. The inclined frame right half ring and the inclined frame right tensioning lug are connected to a right spring compressed chain tensioning apparatus.

In a further improved technical solution of the present invention, the left spring compressed chain tensioning apparatus includes a left inclined chain tensioning rack, a left inclined chain tensioning wheel, and a left inclined chain tensioning spring. The left inclined chain tensioning rack is hooked to one end of the left inclined chain tensioning spring by using a left inclined tensioning rack ring, and the other end of the left inclined chain tensioning spring is hooked to the inclined frame left half ring. The left inclined chain tensioning rack is hingedly connected to the inclined frame left tensioning lug by using an inclined tensioning rack single lug, and the left inclined chain tensioning rack is hingedly connected to the left inclined chain tensioning wheel by using a left inclined tensioning rack double lug. The left inclined chain tensioning rack is configured to drive, under pulling force of the left inclined chain tensioning spring, the left inclined chain tensioning wheel to compress the left inclined conveying chain. The right spring compressed chain tensioning apparatus includes a right inclined chain tensioning rack, a right inclined chain tensioning wheel, and a right inclined chain tensioning spring. The right inclined chain tensioning rack is hooked to one end of the right inclined chain tensioning spring by using a right inclined tensioning rack ring, and the other end of the right inclined chain tensioning spring is hooked to the inclined frame right half ring. The right inclined chain tensioning rack is hingedly connected to the inclined frame right tensioning lug by using a right inclined tensioning rack single lug, and the right inclined chain tensioning rack is hingedly connected to the right inclined chain tensioning wheel by using a right inclined tensioning rack double lug. The right inclined chain tensioning rack is configured to drive, under pulling force of the right inclined chain tensioning spring, the right inclined chain tensioning wheel to compress the right inclined conveying chain.

In a further improved technical solution of the present invention, a connecting base is installed on a back surface of the upper horizontal rod. The drive portion includes a driving motor, a first connecting piece, a reducer, a driving chain, a driving wheel, a second connecting piece, and a rotating shaft. The first connecting piece includes a first connecting rack and a first coupling. The first connecting rack is a hollow structure and the first coupling is located inside the first connecting rack, a housing of the driving motor is fixedly connected to a housing of the reducer by using the first connecting rack, and an output shaft of the driving motor is connected to an input shaft of the reducer by using the first coupling located inside the first connecting rack. The second connecting piece includes a second connecting rack and a second coupling. The second connecting rack is a hollow structure and the second coupling is located inside the second connecting rack. A housing of the reducer is fixedly connected to the connecting base by using the second connecting rack, and an output shaft of the reducer is connected to the rotating shaft by using the second coupling inside the second connecting rack. The rotating shaft is connected to the driving wheel, and the rotating shaft is rotatably connected to the connecting base. The driving chain is separately meshed with the driving wheel and the upper horizontal drive chain wheel.

In a further improved technical solution of the present invention, each of the upper horizontal left chain and the upper horizontal right chain is formed by mutually hingedly connecting a plurality of upper horizontal chain common chain links and a plurality of upper horizontal chain special chain links distributed at intervals. The upper horizontal chain special chain link includes two horizontal special outer chain plates and a horizontal special chain link column. The horizontal special outer chain plate is formed by mutually connecting a horizontal special outer chain plate basic portion and a horizontal special outer chain plate extension portion, and the horizontal special outer chain plate basic portion and the horizontal special outer chain plate extension portion are of an integrated structure. Two horizontal special outer chain plate extension portions are connected by using the horizontal special chain link column. Two horizontal special outer chain plate basic portions are connected by using two pin shafts. Upper horizontal chain special chain links are evenly distributed on the upper horizontal left chain and the upper horizontal right chain. The upper horizontal chain special chain link on the upper horizontal left chain and the upper horizontal chain special chain link on the upper horizontal right chain are symmetrically arranged. Each of the left inclined conveying chain and the right inclined conveying chain is formed by mutually hingedly connecting a plurality of inclined common chain links and a plurality of inclined special chain links distributed at intervals. The inclined special chain link includes an inclined special chain link parallel extension portion, an inclined special chain link vertical extension portion, and two inclined special chain link basic portions. The two inclined special chain link basic portions are connected by using two pin shafts. The inclined special chain link basic portions, the inclined special chain link vertical extension portion, and the inclined special chain link parallel extension portion that are located on an outer side of the inclined special chain link are sequentially connected and are of an integrated structure. Inclined special chain links are evenly distributed on the left inclined conveying chain and the right inclined conveying chain, and the inclined special chain link on the left inclined conveying chain and the inclined special chain link on the right inclined conveying chain are symmetrically arranged. Each of the lower horizontal left chain and the lower horizontal right chain is formed by mutually hingedly connecting a plurality of lower horizontal chain common chain links and a plurality of lower horizontal chain special chain links distributed at intervals. A structure of the lower horizontal chain special chain link is the same as a structure of the upper horizontal chain special chain link, and lower horizontal chain special chain links are evenly distributed on the lower horizontal left chain and the lower horizontal right chain. The lower horizontal chain special chain link on the lower horizontal left chain and the lower horizontal chain special chain link on the lower horizontal right chain are symmetrically arranged.

To implement the foregoing technical objective, another technical solution used in the present invention is as follows.

A transporting and bolting machine includes the steel belt conveying apparatus, a jumbolter, and an installation platform. Both the steel belt conveying apparatus and the jumbolter are fixed on the installation platform.

The present invention has the following beneficial effects.

(1) In the present invention, the upper horizontal conveying portion, the inclined conveying portion (the left inclined conveying chain and the right inclined conveying chain belong to the inclined conveying portion), and the lower horizontal conveying portion are driven by the driving motor of the drive portion for linkage. A steel belt for roof support and protection is placed on the lower horizontal conveying portion, and is driven by a chain of the lower horizontal conveying portion to move to the inclined conveying portion, and the inclined conveying portion drives the steel belt to be conveyed to the upper horizontal conveying portion. A chain of the upper horizontal conveying portion is adjusted to move forwards and backwards, to convey the steel belt to a required position, and then the steel belt is supported and protected. In the whole process, manual handling, lifting, and mounting are reduced, labor intensity of steel belt installation is reduced, and a mechanization level and safety of anchor bolt support and protection are increased.

(2) The upper chain spiral tensioning structure is disposed on the upper horizontal conveying portion, the lower chain spiral tensioning structure is disposed on the lower horizontal conveying portion, and the left spring compressed chain tensioning apparatus and the right spring compressed chain tensioning apparatus are disposed on the inclined conveying portion, and play a chain tensioning role, to prevent a chain from loosening.

(3) An upper horizontal L-shaped limiting plate is disposed at a front end of the upper horizontal conveying portion, to prevent the steel belt from being transported forward excessively and falling and causing personal injury due to operating errors.

(4) The connecting rod frame is hingedly connected to the upper horizontal frame, the inclined frame, and the lower frame, to form a parallel four-connecting-rod mechanism. Driven by the height adjustment cylinder, the parallel four-connecting-rod mechanism moves to adjust a height of the upper horizontal conveying portion, to adapt to different roadway heights. The scale is disposed on a side surface of the upper horizontal frame, to assist the steel belt to achieve precise positioning. Based on the present invention, the steel belt is mechanically conveyed and labor intensity is reduced.

(5) In the present invention, the steel belt conveying apparatus is installed on the transporting and bolting machine, to facilitate coordination working of the jumbolter and the steel belt conveying apparatus. The jumbolter can support and protect the steel belt conveyed by the steel belt conveying apparatus to a roadway roof.

DESCRIPTION OF THE EMBODIMENTS

Specific implementations of the present invention are further described below based on FIG. 1 to FIG. 25.

Figure 1:
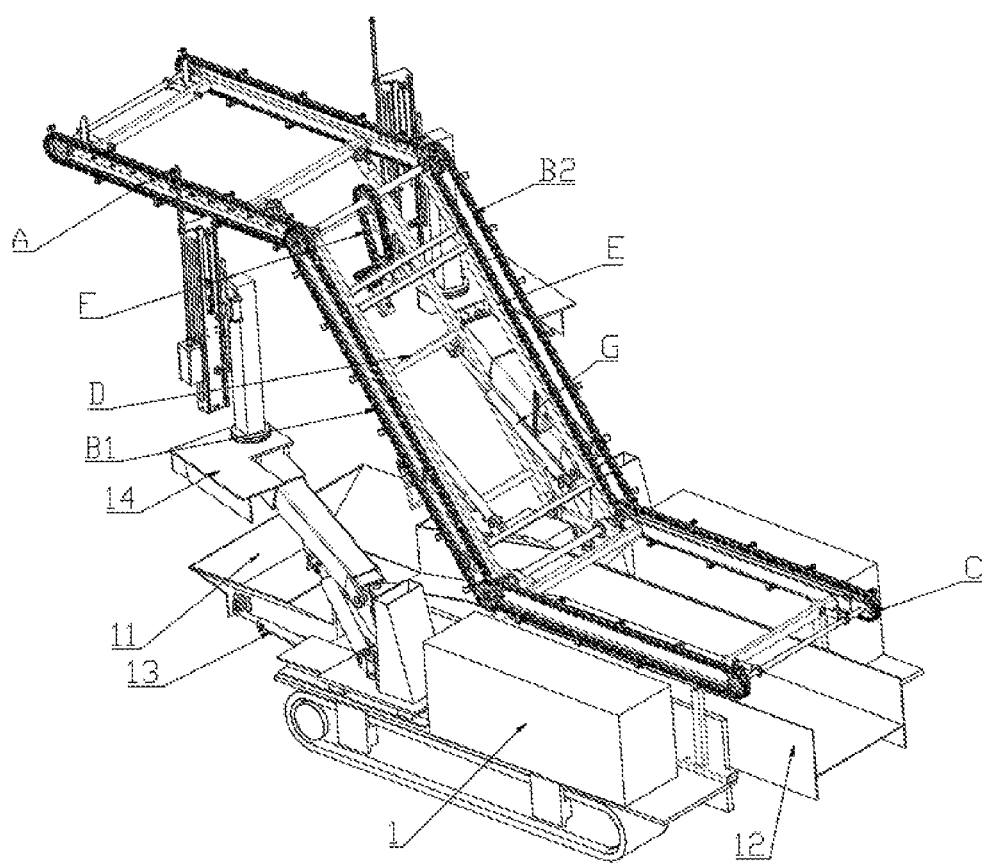
FIG. 1 is an oblique view of a transporting and bolting machine according to the present invention.
Figure 2:
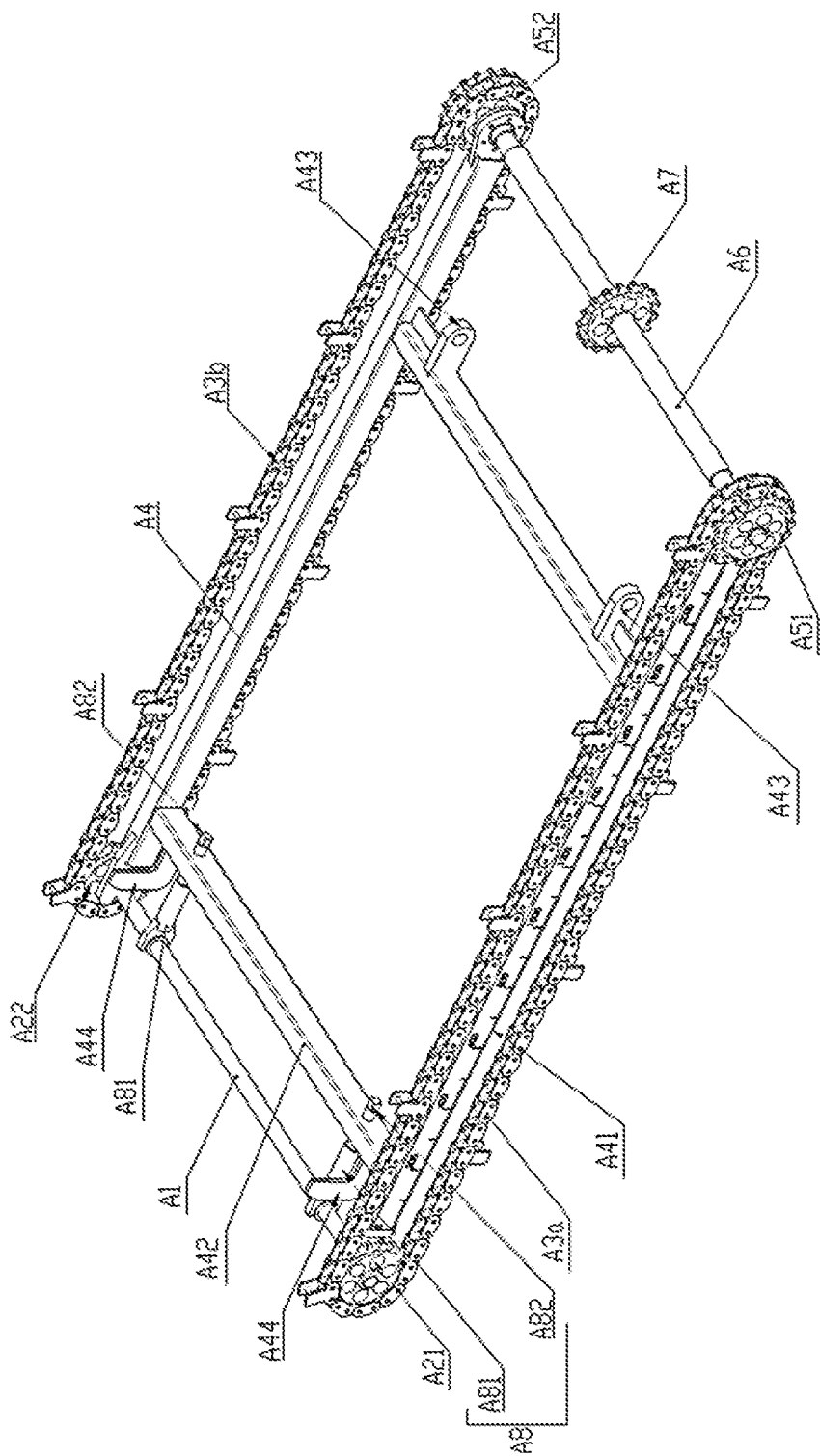
FIG. 2 is a schematic structural diagram of an upper horizontal conveying portion of a steel belt conveying apparatus according to the present invention.

Referring to FIG. 1, an embodiment provides a steel belt conveying apparatus for a transporting and bolting machine. The steel belt conveying apparatus includes an upper horizontal conveying portion A, a left inclined conveying chain B1, a right inclined conveying chain B2 (the left inclined conveying chain B1 and the right inclined conveying chain B2 belong to an inclined conveying portion), a lower horizontal conveying portion C, a connecting rod frame D, an inclined frame E, a drive portion F, and a height adjustment cylinder G. Referring to FIG. 2, the upper horizontal conveying portion A specifically includes an upper horizontal direction changing shaft A1, an upper horizontal left direction changing wheel A21, an upper horizontal right direction changing wheel A22, an upper horizontal left chain A3a, an upper horizontal right chain A3b, an upper horizontal frame A4, an upper horizontal left drive double-chain wheel A51, an upper horizontal right drive double-chain wheel A52, an upper horizontal drive shaft A6, and an upper horizontal drive chain wheel A7. One side of the upper horizontal frame A4 is hingedly connected (rotatably connected in 360 degrees) to two ends of the upper horizontal drive shaft A6. A left end of the upper horizontal drive shaft A6 is fixedly connected to the upper horizontal left drive double-chain wheel A51, and a right end of the upper horizontal drive shaft A6 is fixedly connected to the upper horizontal right drive double-chain wheel A52. Rotation of the upper horizontal drive shaft A6 drives the upper horizontal left drive double-chain wheel A51 and the upper horizontal right drive double-chain wheel A52 to rotate. Both the upper horizontal left drive double-chain wheel A51 and the upper horizontal right drive double-chain wheel A52 are located on an outer side of the upper horizontal frame A4. The other side of the upper horizontal frame A4 is horizontally and slidably connected to the upper horizontal direction changing shaft A1. A left end of the upper horizontal direction changing shaft A1 is hingedly connected (rotatably connected in 360 degrees) to the upper horizontal left direction changing wheel A21, and a right end of the upper horizontal direction changing shaft A1 is hingedly connected (rotatably connected in 360 degrees) to the upper horizontal right direction changing wheel A22. Both the upper horizontal left direction changing wheel A21 and the upper horizontal right direction changing wheel A22 are located on an outer side of the upper horizontal frame A4. Both an inner wheel gear of the upper horizontal left direction changing wheel A21 and an inner wheel gear of the upper horizontal left drive double-chain wheel A51 are meshed with the upper horizontal left chain A3a. The upper horizontal left chain A3a bypasses the inner wheel gear of the upper horizontal left direction changing wheel A21 and the inner wheel gear of the upper horizontal left drive double-chain wheel A51. The upper horizontal left chain A3a, the inner wheel gear of the upper horizontal left direction changing wheel A21, and the inner wheel gear of the upper horizontal left drive double-chain wheel A51 form a closed transmission mechanism. Both an inner wheel gear of the upper horizontal right direction changing wheel A22 and an inner wheel gear of the upper horizontal right drive double-chain wheel A52 are meshed with the upper horizontal right chain A3b. The upper horizontal right chain A3b bypasses the inner wheel gear of the upper horizontal right direction changing wheel A22 and the inner wheel gear of the upper horizontal right drive double-chain wheel A52. The upper horizontal right chain A3b, the inner wheel gear of the upper horizontal right direction changing wheel A22, and the inner wheel gear of the upper horizontal right drive double-chain wheel A52 form a closed transmission mechanism. The upper horizontal left chain A3a and the upper horizontal right chain A3b are symmetrically arranged on two sides, and a middle portion of the upper horizontal drive shaft A6 is fixedly connected to the upper horizontal drive chain wheel A7.

Figure 3:
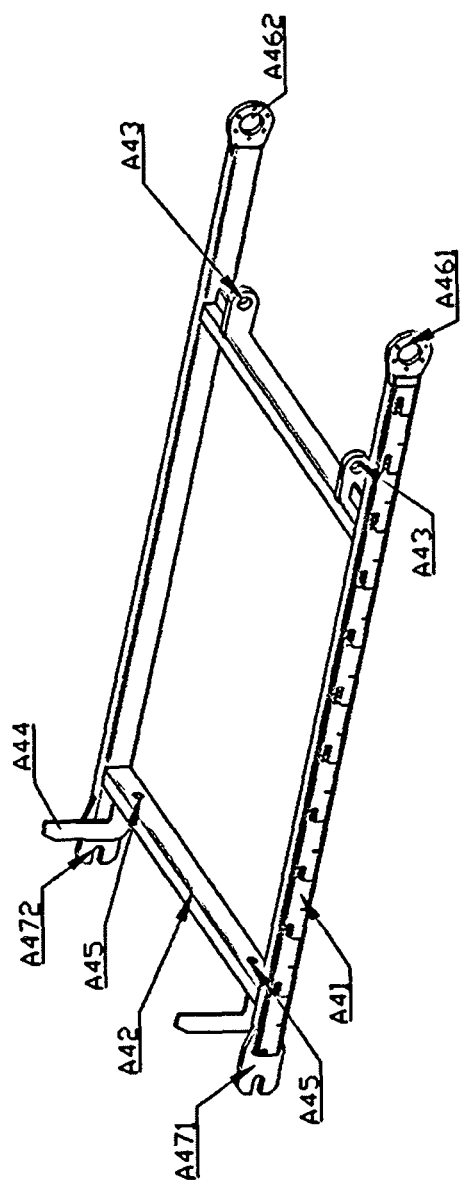
FIG. 3 is a schematic structural diagram of an upper horizontal frame according to the present invention.
Figure 4:
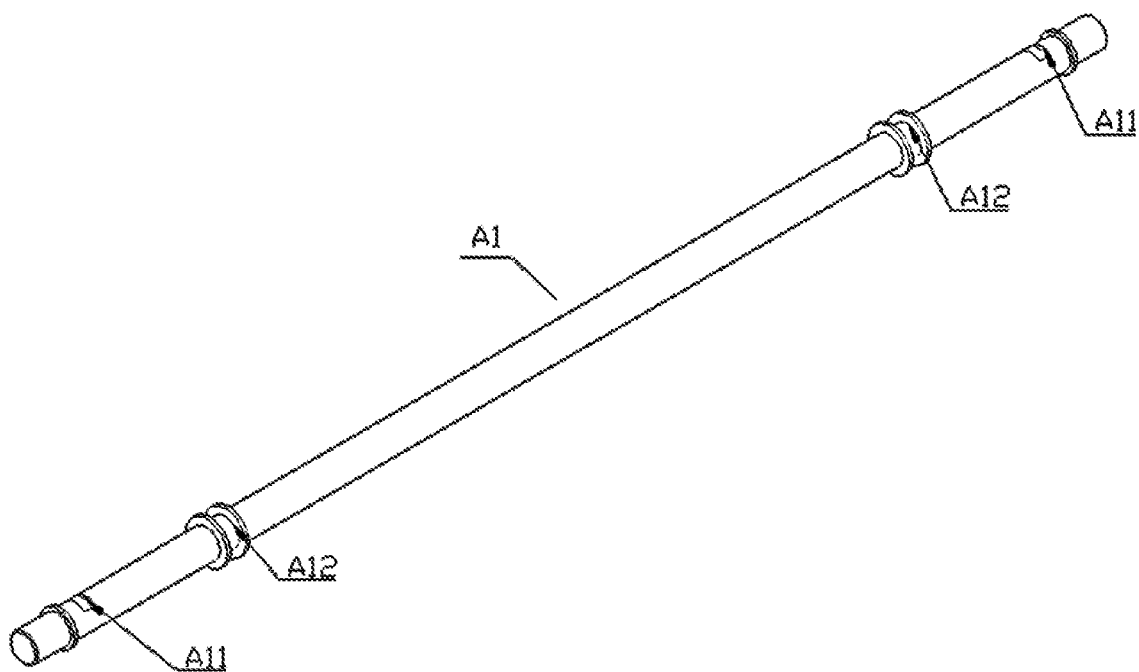
FIG. 4 is a schematic structural diagram of an upper horizontal direction changing shaft according to the present invention.

Referring to FIG. 3, the upper horizontal frame A4 includes an upper horizontal frame left longitudinal tube, an upper horizontal frame right longitudinal tube, an upper horizontal frame front horizontal tube A42, and an upper horizontal frame rear horizontal tube. The upper horizontal frame left longitudinal tube, the upper horizontal frame right longitudinal tube, the upper horizontal frame front horizontal tube A42, and the upper horizontal frame rear horizontal tube are mutually connected to form a quadrilateral frame. Two ends of each of the upper horizontal frame left longitudinal tube and the upper horizontal frame right longitudinal tube respectively extend to form a quadrilateral frame. A specific shape is shown in FIG. 3. Specifically, both a left end of the upper horizontal frame front horizontal tube A42 and a left end of the upper horizontal frame rear horizontal tube are vertically connected to a side surface of the upper horizontal frame left longitudinal tube. Both a right end of the upper horizontal frame front horizontal tube A42 and a right end of the upper horizontal frame rear horizontal tube are vertically connected to a side surface of the upper horizontal frame right longitudinal tube. A front end of the upper horizontal frame left longitudinal tube is provided with an upper horizontal rack left front fork A471, and a rear end of the upper horizontal frame left longitudinal tube is provided with an upper horizontal rear left lug A461. A front end of the upper horizontal frame right longitudinal tube is provided with an upper horizontal rack right front fork A472, and a rear end of the upper horizontal frame right longitudinal tube is provided with an upper horizontal rear right lug A462. The upper horizontal drive shaft A6 passes through the upper horizontal rear left lug A461 and the upper horizontal rear right lug A462, and the upper horizontal drive shaft A6 is separately hingedly connected to the upper horizontal rear left lug A461 and the upper horizontal rear right lug A462 (that is, may rotate by 360 degrees). Two upper horizontal frame hinge lugs A43 are disposed on a rear side surface of the upper horizontal frame rear horizontal tube and are hingedly connected to two ends of a top portion of the connecting rod frame D. Two upper horizontal L-shaped limiting plates A44 are disposed on a front side surface of the upper horizontal frame front horizontal tube A42, and the upper horizontal L-shaped limiting plate A44 plays a safety role, to prevent a steel belt from exceeding a safe position and prevent the steel belt from dropping from a front portion. Referring to FIG. 4, two upper horizontal direction changing shaft notches A11 are provided on a surface of the upper horizontal direction changing shaft A1 and are horizontally and slidably connected to the upper horizontal rack left front fork A471 and the upper horizontal rack right front fork A472 respectively. The upper horizontal direction changing shaft notch A11 cannot rotate within the upper horizontal rack left front fork A471 and the upper horizontal rack right front fork A472. A specific shape is shown in FIG. 4. Two upper chain spiral tensioning structures A8 are disposed between the upper horizontal frame front horizontal tube A42 and the upper horizontal direction changing shaft A1, and a scale A41 is disposed on a side surface of the upper horizontal frame left longitudinal tube. A purpose of the upper chain spiral tensioning structure A8 is to push the upper horizontal direction changing shaft A1, the upper horizontal left direction changing wheel A21, and the upper horizontal right direction changing wheel A22 to move forward, thereby implementing tensioning of the upper horizontal left chain A3a and the upper horizontal right chain A3b. The scale A41 plays a role in assisting the steel belt to achieve precise positioning. With the assistance of the scale A41, the drive portion F is operated forward and reversely to drive each chain to forward and reversely rotate, and to drive the steel belt to move forward and backward, thereby reaching a precise construction position.

Figure 8:
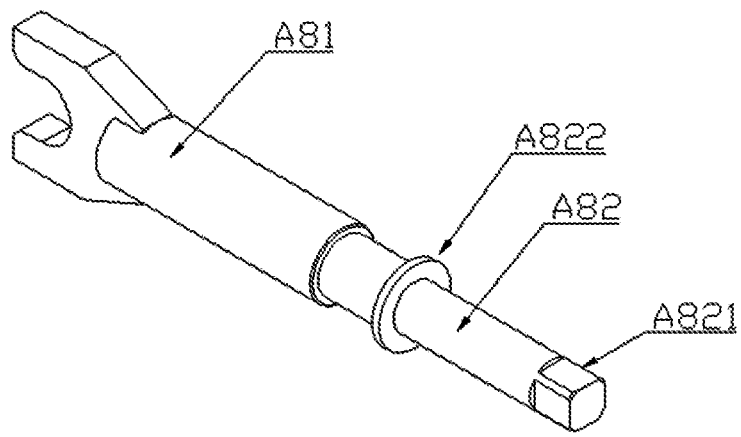
FIG. 8 is a schematic structural diagram of an upper chain spiral tensioning structure according to the present invention.

Referring to FIG. 3, a surface of the upper horizontal frame front horizontal tube A42 is provided with two upper horizontal tensioning installation holes A45. Referring to FIG. 4, two upper horizontal direction changing shaft ring-shaped grooves A12 are provided on the surface of the upper horizontal direction changing shaft A1, and the upper horizontal direction changing shaft ring-shaped groove A12 is located on an inner side of the upper horizontal direction changing shaft notch A11. Referring to FIG. 8, the upper chain spiral tensioning structure A8 includes a tensioning fork A81 and a tensioning screw A82. A circle of a blocking protrusion A822 is disposed on a surface of the tensioning screw A82, and a tensioning screw tail cube A821 is disposed at a tail end. The tail end of the tensioning screw A82 is inserted into and passes through the upper horizontal tensioning installation hole A45, and the blocking protrusion A822 blocks the tensioning screw A82 from continuing passing through. Details are shown in FIG. 2. A front end of the tensioning screw A82 is threadedly connected to a tail end of the tensioning fork A81, an inside portion of the tail end of the tensioning fork A81 is hollow and is provided with a thread, and is connected to a thread at the front end of the tensioning screw A82. A front end of the tensioning fork A81 is inserted into the upper horizontal direction changing shaft ring-shaped groove A12, and the upper chain spiral tensioning structure A8 is configured to implement tensioning of the upper horizontal left chain A3a and the upper horizontal right chain A3b. The tensioning fork A81 is inserted into the upper horizontal direction changing shaft ring-shaped groove A12, and the tensioning screw A82 is inserted into the upper horizontal tensioning installation hole A45 on the upper horizontal frame A4. The tensioning fork A81 is threadedly connected to the tensioning screw A82, and the tensioning fork A81 is pushed out by rotating the tensioning screw A82, to push the upper horizontal direction changing shaft A1, the upper horizontal left direction changing wheel A21, and the upper horizontal right direction changing wheel A22 to move forward, thereby implementing tensioning of the upper horizontal left chain A3a and the upper horizontal right chain A3b.

Figure 5:
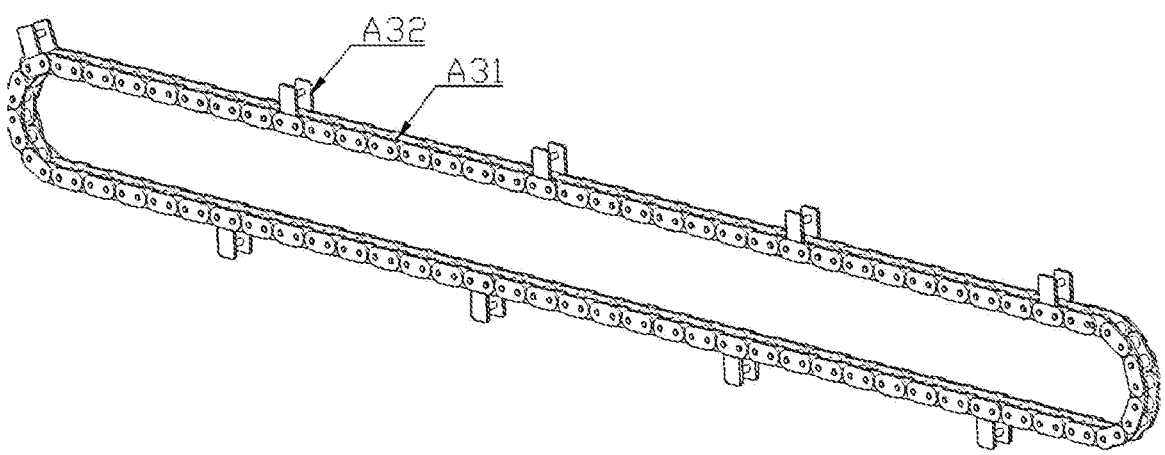
FIG. 5 is a schematic structural diagram of an upper horizontal left chain or an upper horizontal right chain according to the present invention.
Figure 6:
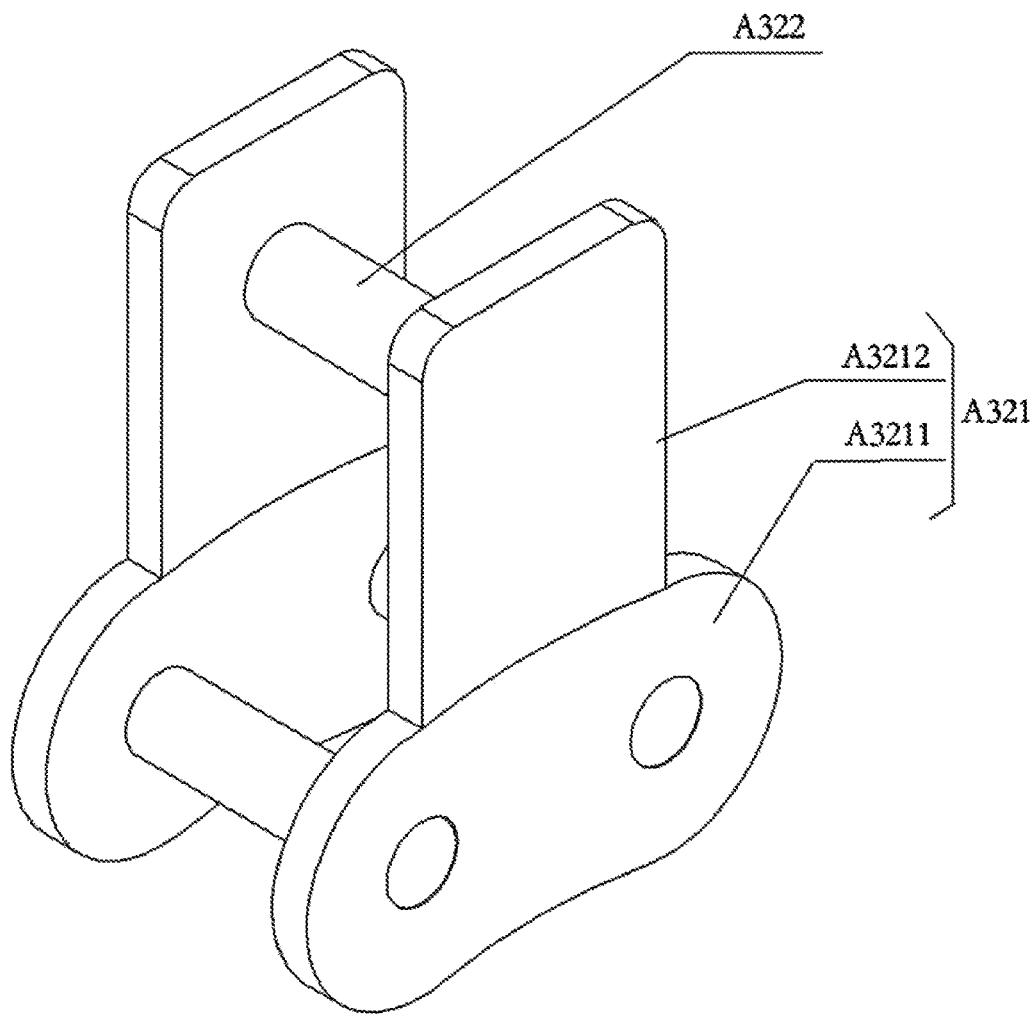
FIG. 6 is a schematic structural diagram of an upper horizontal chain special chain link according to the present invention.

A structure of the upper horizontal left chain A3a is the same as a structure of the upper horizontal right chain A3b, and the structures are both shown in FIG. 5. A total length of the upper horizontal left chain A3a is equal to a total length of the upper horizontal right chain A3b. A plurality of upper horizontal chain special chain links A32 are disposed based on a same quantity and at same intervals and are evenly distributed on the upper horizontal left chain A3a and the upper horizontal right chain A3b. An interval between two adjacent upper horizontal chain special chain links A32 is 300 mm to 600 mm. Referring to FIG. 5, each of the upper horizontal left chain A3a and the upper horizontal right chain A3b is formed by mutually hingedly connecting a plurality of upper horizontal chain common chain links A31 and a plurality of upper horizontal chain special chain links A32 distributed at intervals. Referring to FIG. 6, the upper horizontal chain special chain link A32 includes two horizontal special outer chain plates A321 and a plurality of horizontal special chain link columns A322. The horizontal special outer chain plate A321 is formed by mutually connecting a horizontal special outer chain plate basic portion A3211 and a horizontal special outer chain plate extension portion A3212, and the horizontal special outer chain plate basic portion A3211 and the horizontal special outer chain plate extension portion A3212 are of an integrated structure. Two horizontal special outer chain plate extension portions A3212 are fixedly connected by using the horizontal special chain link column A322. Two horizontal special outer chain plate basic portions A3211 are connected by using two pin shafts, and two ends of the pin shaft are fixedly connected to the two horizontal special outer chain plate basic portions A3211 through interference fitting. Upper horizontal chain special chain links A32 are evenly distributed on the upper horizontal left chain A3a and the upper horizontal right chain A3b, and the upper horizontal chain special chain link A32 on the upper horizontal left chain A3a and the upper horizontal chain special chain link A32 on the upper horizontal right chain A3b are symmetrically arranged. A purpose of the upper horizontal chain special chain link A32 and the upper horizontal chain common chain link A31 is to push the steel belt to move forward. The upper horizontal chain special chain link A32 is hingedly connected to the upper horizontal chain common chain link A31 by using the horizontal special outer chain plate basic portion A3211. The upper horizontal chain common chain link A31 is formed by two pin shafts and two common chain plates having a same shape as the horizontal special outer chain plate basic portion A3211.

Figure 9:
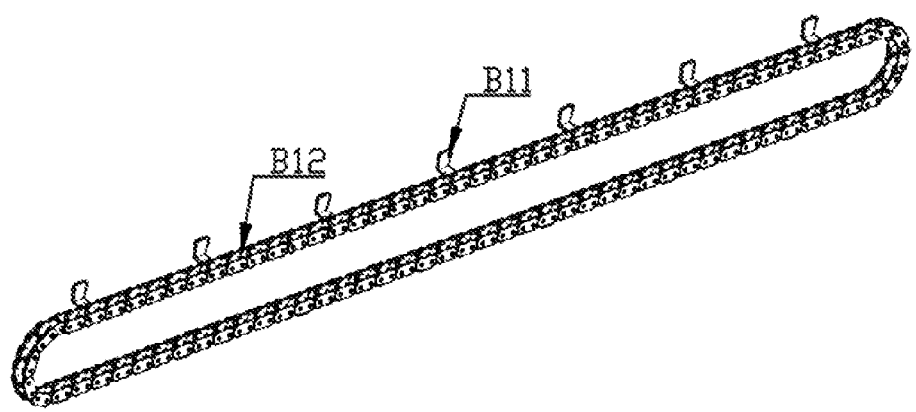
FIG. 9 is a schematic structural diagram of a left inclined conveying chain or a right inclined conveying chain according to the present invention.
Figure 10:
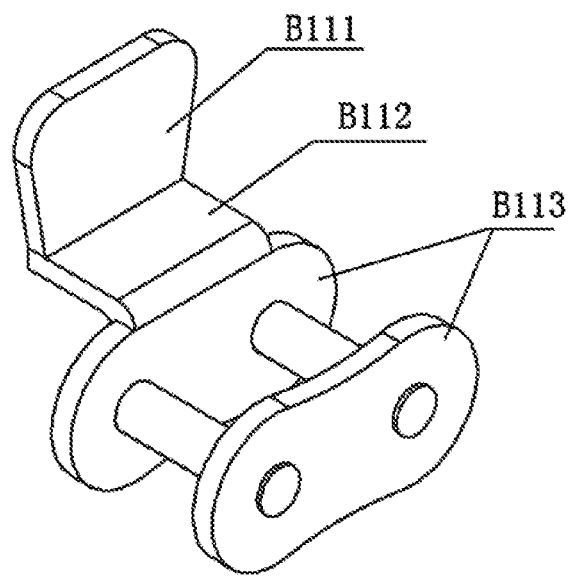
FIG. 10 is a schematic structural diagram of an inclined special chain link according to the present invention.

Referring to FIG. 9, the left inclined conveying chain B1 and the right inclined conveying chain B2 are symmetrical to each other, and have a same structure and a same total length. A specific structure is shown in FIG. 9. A plurality of inclined special chain links B11 are disposed on each of the left inclined conveying chain B1 and the right inclined conveying chain B2 and are evenly disposed on the left inclined conveying chain B1 and the right inclined conveying chain B2. An interval between adjacent inclined special chain links B11 is 300 mm to 600 mm. Referring to FIG. 9, each of the left inclined conveying chain B1 and the right inclined conveying chain B2 is formed by mutually hingedly connecting a plurality of inclined common chain links B12 and a plurality of inclined special chain links B11 distributed at intervals. Referring to FIG. 10, the inclined special chain link B11 includes an inclined special chain link parallel extension portion B111, an inclined special chain link vertical extension portion B112, and two inclined special chain link basic portions B113. The two inclined special chain link basic portions B113 are connected by using two pin shafts, and two ends of the pin shaft are fixedly connected to the two inclined special chain link basic portions B113 through interference fitting. The inclined special chain link basic portions B113, the inclined special chain link vertical extension portion B112, and the inclined special chain link parallel extension portion B111 that are located on an outer side of the inclined special chain link B11 are sequentially connected and are of an integrated structure. Inclined special chain links B11 are evenly distributed on the left inclined conveying chain B1 and the right inclined conveying chain B2, and the inclined special chain link B11 on the left inclined conveying chain B1 and the inclined special chain link B11 on the right inclined conveying chain B2 are symmetrically arranged. The inclined special chain link B11 is hingedly connected to the inclined common chain link B12 by using the inclined special chain link basic portion B113, and the inclined common chain link B12 and the upper horizontal chain common chain link A31 have a same structure. The left inclined conveying chain B1 bypasses an outer wheel gear of the upper horizontal left drive double-chain wheel A51 and an outer wheel gear of the lower horizontal left drive double-chain wheel C51, to form a chain transmission structure. The right inclined conveying chain B2 bypasses an outer wheel gear of the upper horizontal right drive double-chain wheel A52 and an outer wheel gear of the lower horizontal right drive double-chain wheel C52, to form a chain transmission structure.

Figure 11:
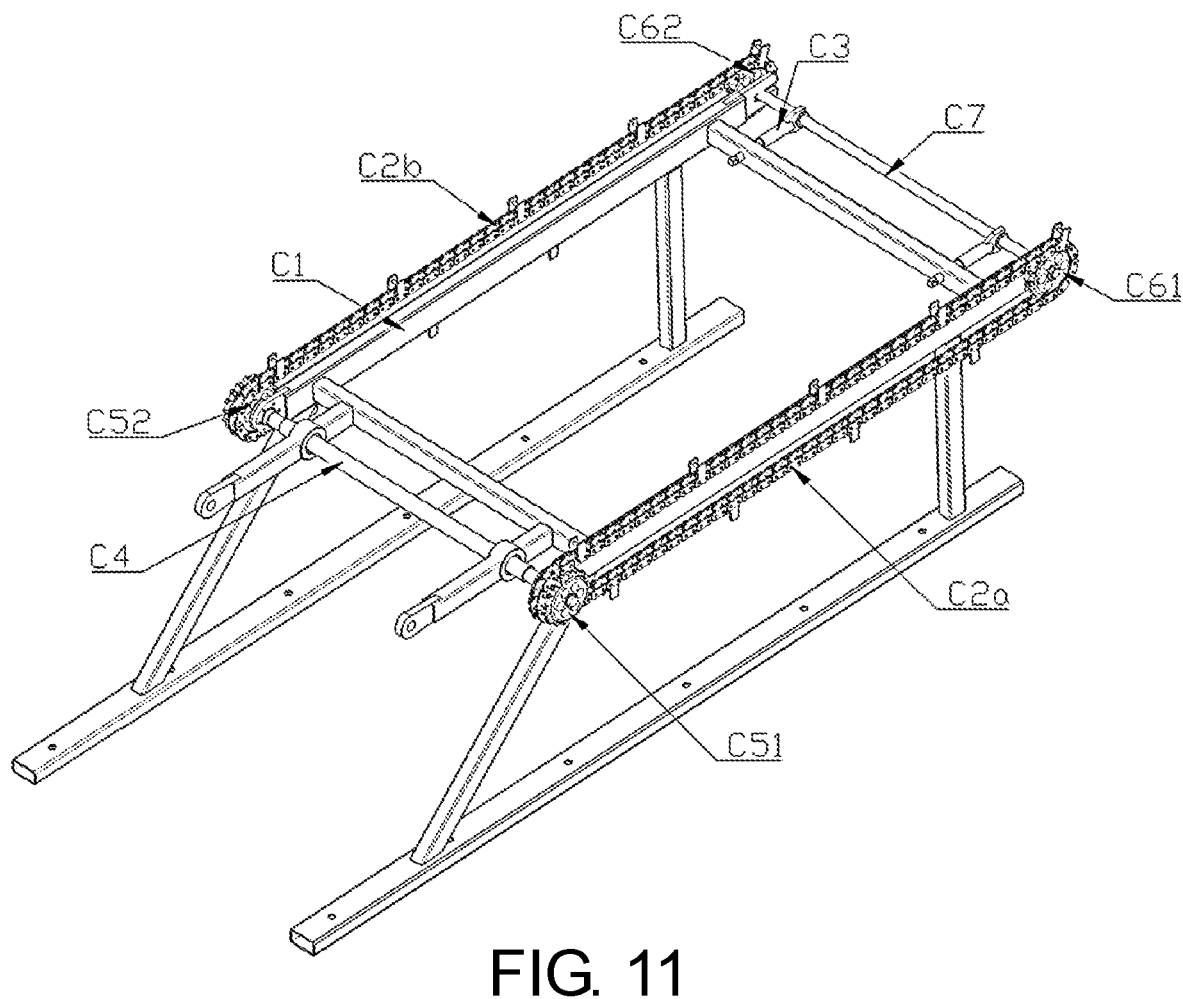
FIG. 11 is a schematic structural diagram of a lower horizontal conveying portion according to the present invention.

Referring to FIG. 11, the lower horizontal conveying portion C includes a lower frame C1, a lower horizontal left chain C2a, a lower horizontal right chain C2b, a lower horizontal drive shaft C4, a lower horizontal left drive double-chain wheel C51, a lower horizontal right drive double-chain wheel C52, a lower horizontal left direction changing chain wheel C61, a lower horizontal right direction changing chain wheel C62, and a lower horizontal direction changing shaft C7. One side of the lower frame C1 is hingedly connected (rotatably connected in 360 degrees) to the lower horizontal drive shaft C4. A left end of the lower horizontal drive shaft C4 is fixedly connected to the lower horizontal left drive double-chain wheel C51, and a right end of the lower horizontal drive shaft C4 is fixedly connected to the lower horizontal right drive double-chain wheel C52. Rotation of the lower horizontal drive shaft C4 drives the lower horizontal left drive double-chain wheel C51 and the lower horizontal right drive double-chain wheel C52 to rotate. The other side of the lower frame C1 is horizontally and slidably connected to the lower horizontal direction changing shaft C7. A left end of the lower horizontal direction changing shaft C7 is hingedly connected (rotatably connected in 360 degrees) to the lower horizontal left direction changing chain wheel C61, and a right end of the lower horizontal direction changing shaft C7 is hingedly connected (rotatably connected in 360 degrees) to the lower horizontal right direction changing chain wheel C62. Both an inner wheel gear of the lower horizontal left drive double-chain wheel C51 and the lower horizontal left direction changing chain wheel C61 are meshed with the lower horizontal left chain C2a. The lower horizontal left chain C2a bypasses the inner wheel gear of the lower horizontal left drive double-chain wheel C51 and the lower horizontal left direction changing chain wheel C61. The lower horizontal left chain C2a, the inner wheel gear of the lower horizontal left drive double-chain wheel C51, and the lower horizontal left direction changing chain wheel C61 form a closed transmission structure. Both an inner wheel gear of the lower horizontal right drive double-chain wheel C52 and the lower horizontal right direction changing chain wheel C62 are meshed with the lower horizontal right chain C2b. The lower horizontal right chain C2b bypasses the inner wheel gear of the lower horizontal right drive double-chain wheel C52 and the lower horizontal right direction changing chain wheel C62. The lower horizontal right chain C2b, the inner wheel gear of the lower horizontal right drive double-chain wheel C52, and the lower horizontal right direction changing chain wheel C62 form a closed transmission structure. The left inclined conveying chain B1 is separately meshed with the outer wheel gear of the upper horizontal left drive double-chain wheel A51 and the outer wheel gear of the lower horizontal left drive double-chain wheel C51, and the right inclined conveying chain B2 is separately meshed with the outer wheel gear of the upper horizontal right drive double-chain wheel A52 and the outer wheel gear of the lower horizontal right drive double-chain wheel C52. The top portion of the connecting rod frame D is hingedly connected to the upper horizontal frame hinge lug A43 on the upper horizontal frame A4, and a bottom portion of the connecting rod frame D is hingedly connected to the lower frame C1. A top portion of the inclined frame E is hingedly connected (rotatably connected in 360 degrees) to the upper horizontal drive shaft A6, and a bottom portion of the inclined frame E is hingedly connected (rotatably connected in 360 degrees) to the lower horizontal drive shaft C4. The drive portion F is fixed on the inclined frame E and is connected to the upper horizontal drive chain wheel A7, to drive the upper horizontal drive chain wheel A7 to rotate. A cylinder tail of the height adjustment cylinder G is hingedly connected to the inclined frame E and a piston rod is hingedly connected to the connecting rod frame D. The connecting rod frame D is separately hingedly connected to the upper horizontal frame A4, the inclined frame E, and the lower frame C1, to form a parallel four-connecting-rod structure. Extension and contraction of the height adjustment cylinder G may drive the parallel four-connecting-rod structure to act, thereby adjusting a height of the upper horizontal conveying portion A, to adapt to different roadway heights. The lower frame C1 is fixed on the transporting and bolting machine 1.

Figure 7:
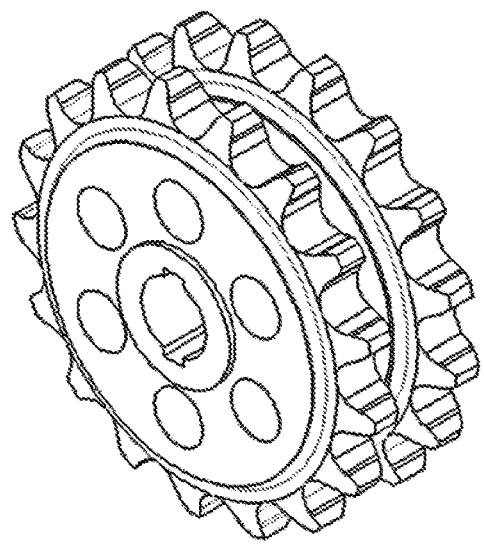
FIG. 7 is a schematic structural diagram of an upper horizontal left drive double-chain wheel or an upper horizontal right drive double-chain wheel according to the present invention.

All the upper horizontal left drive double-chain wheel A51, the upper horizontal right drive double-chain wheel A52, the lower horizontal left drive double-chain wheel C51, and the lower horizontal right drive double-chain wheel C52 have a same structure. A specific structure shape is shown in FIG. 7.

Figure 12:
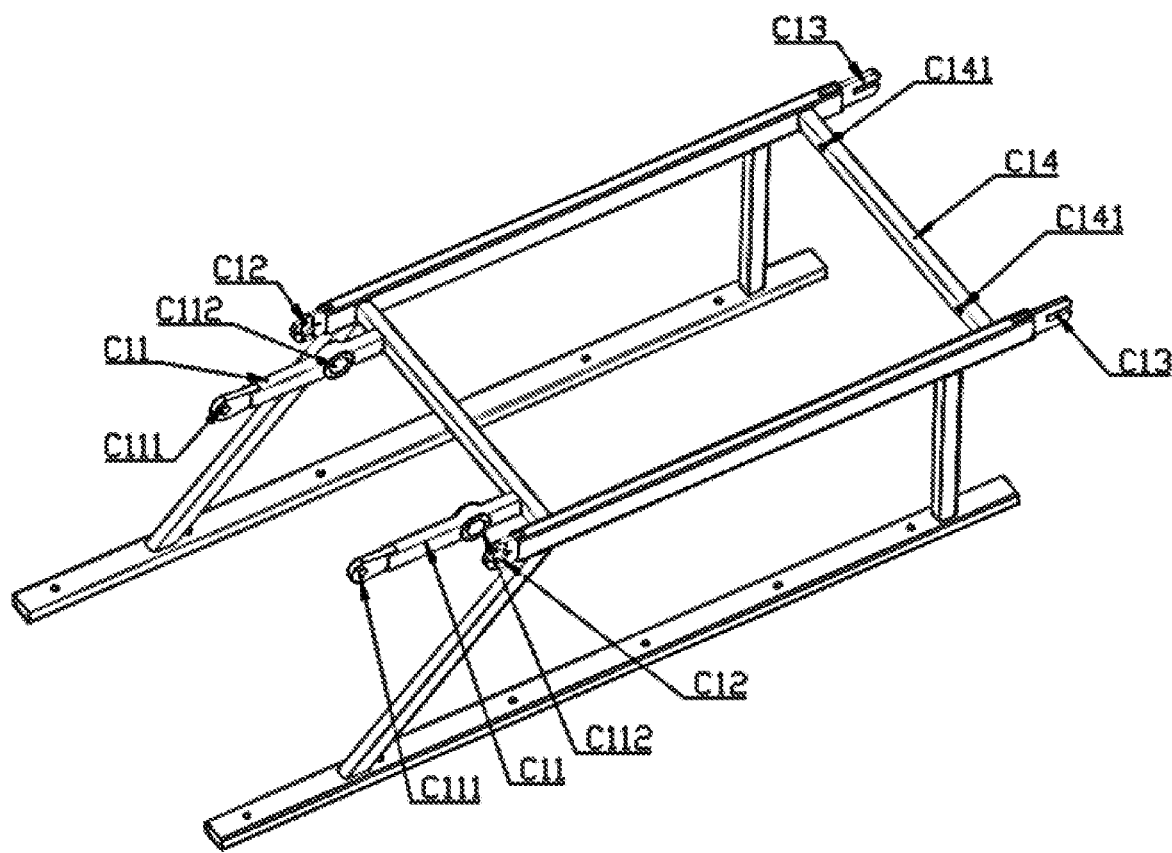
FIG. 12 is a schematic structural diagram of a lower frame according to the present invention.

Referring to FIG. 12, the lower frame C1 includes a lower frame front longitudinal tube C11, a lower frame front beam, a lower frame rear beam C14, a lower frame left longitudinal beam, and a lower frame right longitudinal beam. The lower frame front beam and the lower frame rear beam C14 are parallel to each other. The lower frame front longitudinal tube C11, the lower frame left longitudinal beam, and the lower frame right longitudinal beam are parallel to each other. Both a left end of the lower frame front beam and a left end of the lower frame rear beam C14 are vertically connected to a side surface of the lower frame left longitudinal beam. Both a right end of the lower frame front beam and a right end of the lower frame rear beam C14 are vertically connected to a side surface of the lower frame right longitudinal beam. A lower frame front lug C12 is disposed at each of a front end of the lower frame left longitudinal beam and a front end of the lower frame right longitudinal beam. A lower frame rear slot seat C13 is disposed at each of a rear end of the lower frame left longitudinal beam and a rear end of the lower frame right longitudinal beam. A rear end of the lower frame front longitudinal tube C11 is fixedly connected to a front side surface of the lower frame front beam. A front longitudinal tube hole C112 is provided on the lower frame front longitudinal tube C11. The front longitudinal tube hole C112 and a hole of the lower frame front lug C12 are in a same vertical direction. A front longitudinal single lug C111 is disposed at a front end of the lower frame front longitudinal tube C11. The lower horizontal drive shaft C4 passes through the front longitudinal tube hole C112 and the lower frame front lug C12. The lower horizontal drive shaft C4 is separately hingedly connected (rotatably connected in 360 degrees, where details are shown in FIG. 11) to the lower frame front longitudinal tube C11 and the lower frame front lug C12. The front longitudinal single lug C111 is hingedly connected to two ends of the bottom portion of the connecting rod frame D. The lower horizontal direction changing shaft C7 and the upper horizontal direction changing shaft A1 have a same structure. Two lower horizontal direction changing shaft notches are provided on a surface of the lower horizontal direction changing shaft C7 and are horizontally and slidably connected to the lower frame rear slot seat C13 separately. The rear end of the lower frame rear slot seat C13 and the front end of the upper horizontal rack left front fork A471 have a same function, and are both used for a horizontal and slidable connection. A lower chain spiral tensioning structure C3 is disposed between the lower frame rear beam C14 and the lower horizontal direction changing shaft C7. A lower frame tensioning installation hole C141 is provided on a surface of the lower frame rear beam C14. A lower horizontal direction changing shaft ring-shaped groove is provided on the surface of the lower horizontal direction changing shaft C7. A structure of the lower chain spiral tensioning structure C3 is the same as a structure of the upper chain spiral tensioning structure A8. A tail end of the lower chain spiral tensioning structure C3 is inserted into the lower frame tensioning installation hole C141, and a front end of the lower chain spiral tensioning structure C3 is inserted into the lower horizontal direction changing shaft ring-shaped groove. The lower chain spiral tensioning structure C3 is configured to implement tensioning of the lower horizontal left chain C2a and the lower horizontal right chain C2b. Each of the lower frame left longitudinal beam and the lower frame right longitudinal beam is connected to a seat by using a support rack, and the seat is fixed on the transporting and bolting machine 1.

Figure 13:
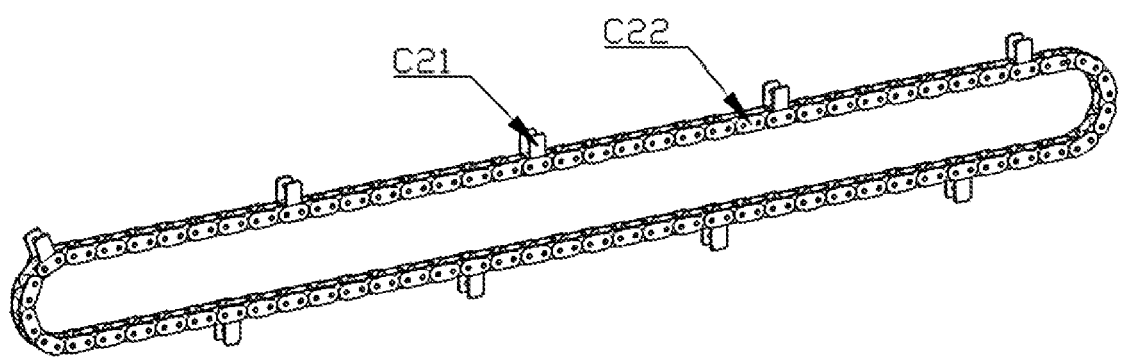
FIG. 13 is a schematic structural diagram of a lower horizontal left chain or a lower horizontal right chain according to the present invention.

A structure of the lower horizontal left chain C2a is the same as a structure of the lower horizontal right chain C2b, the lower horizontal left chain C2a and the lower horizontal right chain C2b are symmetrically arranged, and the structures are both shown in FIG. 13. A total length of the lower horizontal left chain C2a is equal to a total length of the lower horizontal right chain C2b. A plurality of lower horizontal chain special chain links C21 are disposed based on a same quantity and at same intervals and are evenly distributed on the lower horizontal left chain C2a and the lower horizontal right chain C2b. Specifically, each of the lower horizontal left chain C2a and the lower horizontal right chain C2b is formed by mutually hingedly connecting a plurality of lower horizontal chain common chain links C22 and a plurality of lower horizontal chain special chain links C21 distributed at intervals. A structure of the lower horizontal chain special chain link C21 is the same as a structure of the upper horizontal chain special chain link A32. Lower horizontal chain special chain links C21 are evenly distributed on the lower horizontal left chain C2a and the lower horizontal right chain C2b. The lower horizontal chain special chain link C21 on the lower horizontal left chain C2a and the lower horizontal chain special chain link C21 on the lower horizontal right chain C2b are symmetrically arranged. A structure of the lower horizontal chain common chain link C22 is the same as a structure of the upper horizontal chain common chain link A31.

Figure 14:
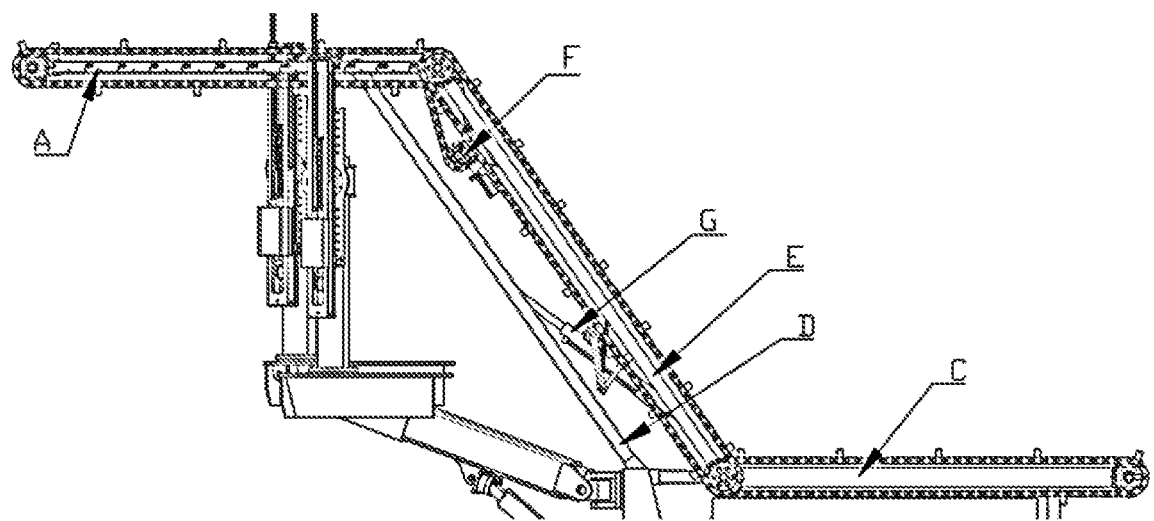
FIG. 14 is a side view of a steel belt conveying apparatus according to the present invention.
Figure 15:
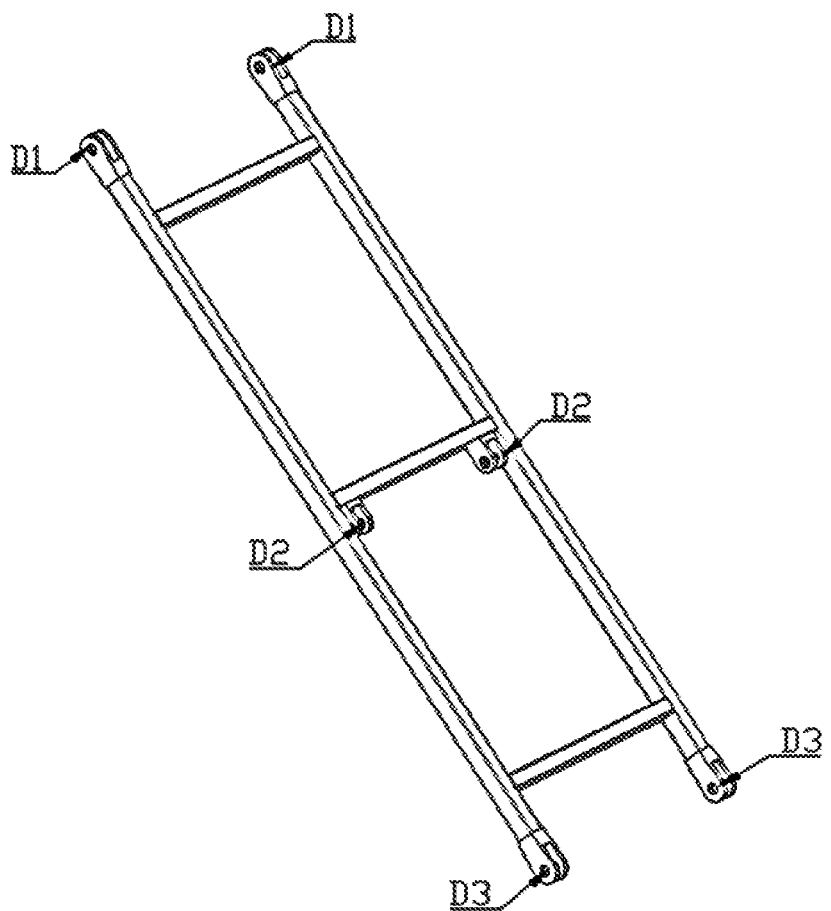
FIG. 15 is a schematic structural diagram of a connecting rod frame according to the present invention.

FIG. 14 is a side view of a steel belt conveying apparatus according to the present invention. The connecting rod frame D includes three horizontal rods and two vertical rods, and the three horizontal rods and the two vertical rods are mutually combined to form a ladder shape. As shown in FIG. 15, a connecting rod frame upper lug D1 is disposed at an upper end of each of the two vertical rods of the connecting rod frame D and a connecting rod frame lower lug D3 is disposed at a lower end of each of the two vertical rods of the connecting rod frame D. Two connecting rod frame intermediate lugs D2 are disposed on a lower side surface of the horizontal rod in the middle of the connecting rod frame D. There are two upper horizontal frame hinge lugs A43, and the connecting rod frame upper lug D1 is hingedly connected to the upper horizontal frame hinge lug A43. There are two lower frame front longitudinal tubes C11, and the connecting rod frame lower lug D3 is hingedly connected to the front longitudinal single lug C111 at the front end of the lower frame front longitudinal tube C11. The connecting rod frame intermediate lug D2 is hingedly connected to the piston rod of the height adjustment cylinder G.

Figure 16:
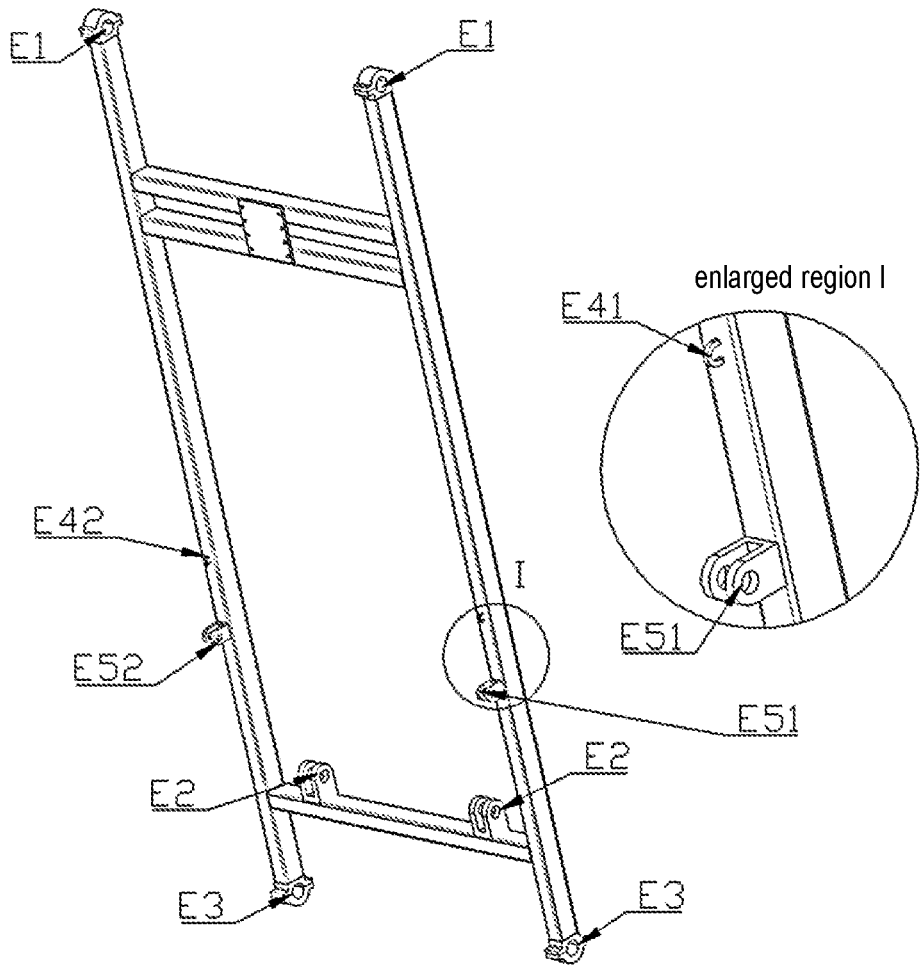
FIG. 16 is a schematic structural diagram of an inclined frame according to the present invention.

Referring to FIG. 16, the inclined frame E includes a left vertical rod and a right vertical rod. A lower horizontal rod and an upper horizontal rod are vertically connected between the left vertical rod and the right vertical rod. The lower horizontal rod is located at a lower middle portion of the left vertical rod and the right vertical rod. The upper horizontal rod is located at a upper middle portion of the left vertical rod and the right vertical rod. An inclined frame upper opening E1 is provided at each of upper ends of the left vertical rod and the right vertical rod, and an inclined frame lower opening E3 is provided at each of lower ends of the left vertical rod and the right vertical rod. The inclined frame upper opening E1 is sleeved on the upper horizontal drive shaft A6 and is hingedly connected (rotatably connected in 360 degrees) to the upper horizontal drive shaft A6. The inclined frame lower opening E3 is sleeved on the lower horizontal drive shaft C4 and is hingedly connected (rotatably connected in 360 degrees) to the lower horizontal drive shaft C4. An inclined frame cylinder lug E2 is disposed on an upper side surface of the lower horizontal rod and is hingedly connected to the cylinder tail of the height adjustment cylinder G. An inclined frame left half ring E41 and an inclined frame left tensioning lug E51 are disposed on a back surface of the left vertical rod. The inclined frame left half ring E41 is located above the inclined frame left tensioning lug E51. An inclined frame right half ring E42 and an inclined frame right tensioning lug E52 are disposed on a back surface of the right vertical rod. The inclined frame right half ring E42 is located above the inclined frame right tensioning lug E52. The inclined frame left half ring E41 and the inclined frame left tensioning lug E51 are connected to a left spring compressed chain tensioning apparatus H1, and the inclined frame right half ring E42 and the inclined frame right tensioning lug E52 are connected to a right spring compressed chain tensioning apparatus H2. The left spring compressed chain tensioning apparatus H1 is configured to implement tensioning of the left inclined conveying chain B1, and the right spring compressed chain tensioning apparatus H2 is configured to implement tensioning of the right inclined conveying chain B2.

Figure 17:
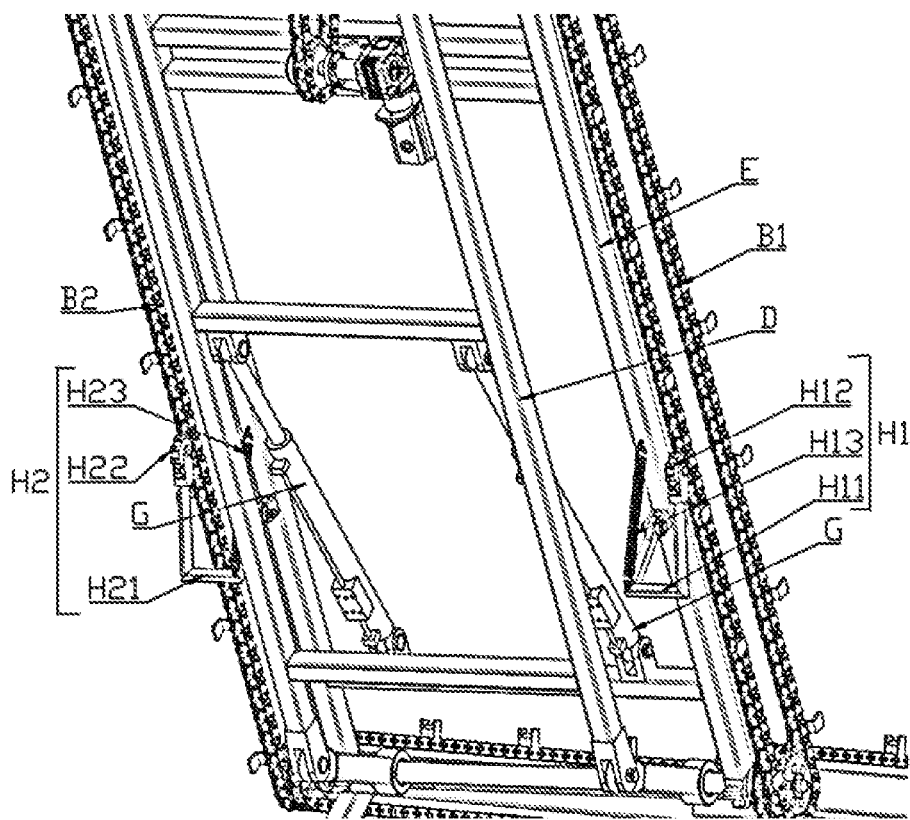
FIG. 17 is a schematic structural diagram of a left spring compressed chain tensioning apparatus and a right spring compressed chain tensioning apparatus according to the present invention.
Figure 18:
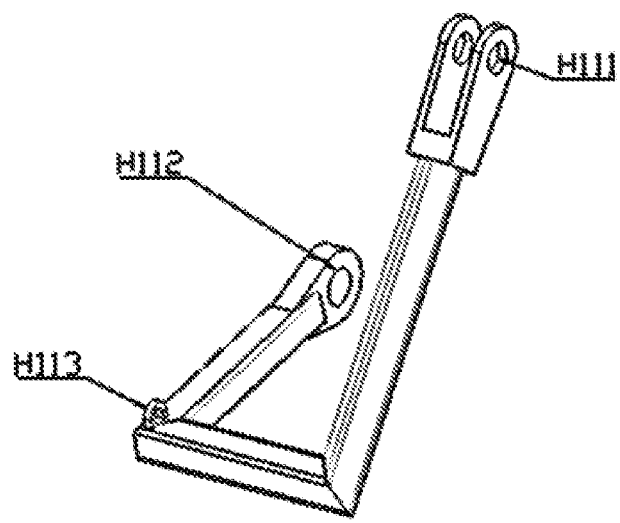
FIG. 18 is a schematic structural diagram of a left inclined chain tensioning rack according to the present invention.
Figure 19:
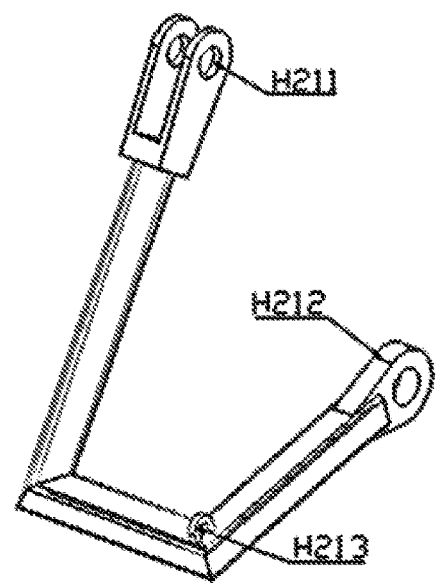
FIG. 19 is a schematic structural diagram of a right inclined chain tensioning rack according to the present invention.

Referring to FIG. 17, the left spring compressed chain tensioning apparatus H1 includes a left inclined chain tensioning rack H11, a left inclined chain tensioning wheel H12, and a left inclined chain tensioning spring H13. A structure of the left inclined chain tensioning rack H11 is shown in FIG. 19. The left inclined chain tensioning rack H11 is hooked to one end of the left inclined chain tensioning spring H13 by using a left inclined tensioning rack ring H113, and the other end of the left inclined chain tensioning spring H13 is hooked to the inclined frame left half ring E41. The left inclined chain tensioning rack H11 is hingedly connected to the inclined frame left tensioning lug E51 by using an inclined tensioning rack single lug H112, and the left inclined chain tensioning rack H11 is hingedly connected to the left inclined chain tensioning wheel H12 by using a left inclined tensioning rack double lug H111. The left inclined chain tensioning rack H11 is configured to drive, under pulling force of the left inclined chain tensioning spring H13, the left inclined chain tensioning wheel H12 to compress the left inclined conveying chain B1.

Figure 20:
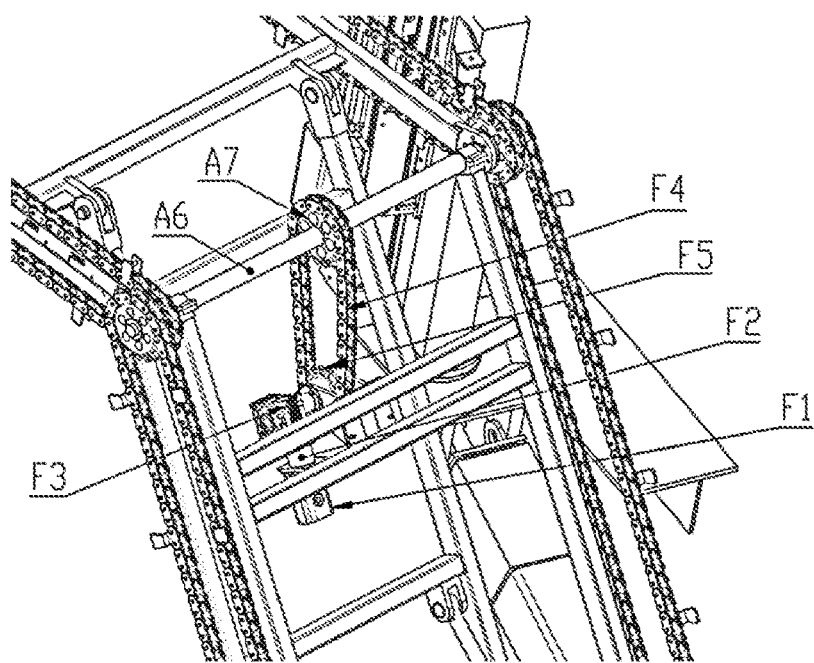
FIG. 20 is a schematic structural diagram of a drive portion according to the present invention.

Referring to FIG. 17, the right spring compressed chain tensioning apparatus H2 includes a right inclined chain tensioning rack H21, a right inclined chain tensioning wheel H22, and a right inclined chain tensioning spring H23. A structure of the right inclined chain tensioning rack H21 is shown in FIG. 20. The right inclined chain tensioning rack H21 is hooked to one end of the right inclined chain tensioning spring H23 by using a right inclined tensioning rack ring H213. The other end of the right inclined chain tensioning spring H23 is hooked to the inclined frame right half ring E42. The right inclined chain tensioning rack H21 is hingedly connected to the inclined frame right tensioning lug E52 by using a right inclined tensioning rack single lug H212. The right inclined chain tensioning rack H21 is hingedly connected to the right inclined chain tensioning wheel H22 by using a right inclined tensioning rack double lug H211. The right inclined chain tensioning rack H21 is configured to drive, under pulling force of the right inclined chain tensioning spring H23, the right inclined chain tensioning wheel H22 to compress the right inclined conveying chain B2.

Figure 21:
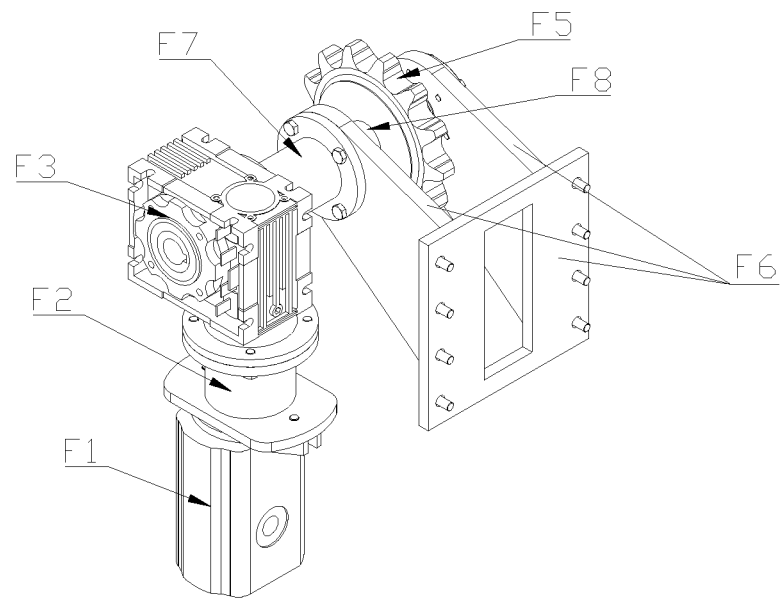
FIG. 21 is a schematic diagram of a partial structure of a drive portion according to the present invention.

Referring to FIG. 16 and FIG. 21, there are two upper horizontal rods. A connecting base F6 is installed on a back surface of the upper horizontal rod by using a fixing plate. The drive portion F includes a driving motor F1, a first connecting piece F2, a reducer F3, a driving chain F4, a driving wheel F5, a second connecting piece F7, and a rotating shaft F8. The first connecting piece F2 includes a first connecting rack and a first coupling. The first connecting rack is a hollow structure and the first coupling is located inside the first connecting rack. A housing of the driving motor F1 is fixedly connected to a housing of the reducer F3 by using the first connecting rack. Two ends of the first connecting rack are separately and fixedly connected to the housing of the driving motor F1 and the housing of the reducer F3 by using a flange. An output shaft of the driving motor F1 is connected to an input shaft of the reducer F3 by using the first coupling located inside the first connecting rack. The output shaft of the driving motor F1, the first coupling, and the input shaft of the reducer F3 may all rotate in the first connecting rack. The second connecting piece F7 includes a second connecting rack and a second coupling. The second connecting rack is a hollow structure and the second coupling is located inside the second connecting rack. The housing of the reducer F3 is fixedly connected to the connecting base F6 by using the second connecting rack. An output shaft of the reducer F3 is connected to the rotating shaft F8 by using the second coupling inside the second connecting rack. The output shaft of the reducer F3 and the second coupling may both rotate in the second connecting rack. The rotating shaft F8 is connected to the driving wheel F5, the rotating shaft F8 is rotatably connected to the connecting base F6 in 360 degrees, and the driving chain F4 is separately meshed with the driving wheel F5 and the upper horizontal drive chain wheel A7. The driving motor F1 drives, by using the reducer F3 and the rotating shaft F8, the driving wheel F5 to rotate. The driving wheel F5 drives, by using the driving chain F4, the upper horizontal drive chain wheel A7 to rotate. The upper horizontal drive chain wheel A7 drives the upper horizontal drive shaft A6 to rotate, to enable an entire chain structure to act.

Figures 22, 23, 24:
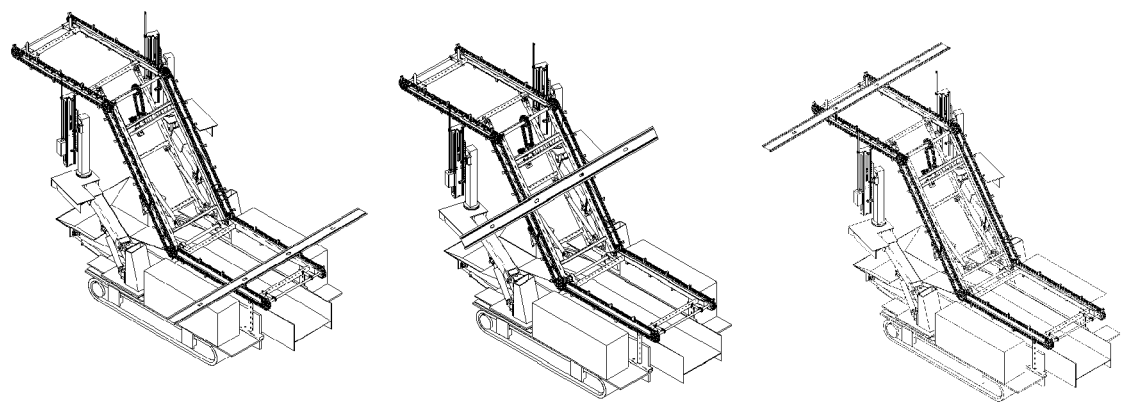
FIG. 22 is a schematic structural diagram of placing a steel belt on a lower horizontal conveying portion according to the present invention.
FIG. 23 is a schematic structural diagram of placing a steel belt on a left inclined conveying chain and a right inclined conveying chain according to the present invention.
FIG. 24 is a schematic structural diagram of placing a steel belt on an upper horizontal conveying portion according to the present invention.
Figure 25:
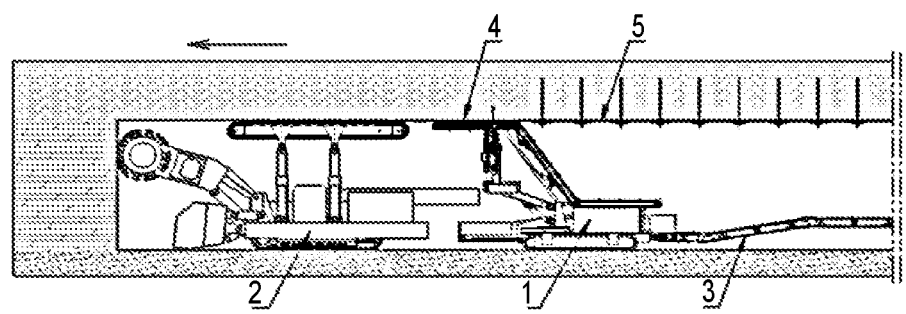
FIG. 25 is a diagram of an implementation case.

A working principle of this embodiment is as follows. The drive portion F is fixed together with the inclined frame E. When the driving motor F1 rotates, the driving wheel F5 is driven by using the first coupling in the first connecting piece F2, the reducer F3, the second coupling in the second connecting piece F7, and the rotating shaft F8, to rotate, so as to drive, by using the driving chain F4, the upper horizontal drive chain wheel A7 to rotate. The upper horizontal drive chain wheel A7 is fixed together with the upper horizontal drive shaft A6. The upper horizontal left drive double-chain wheel A51 and the upper horizontal right drive double-chain wheel A52 are driven, by using the upper horizontal drive shaft A6, to rotate, so as to drive the upper horizontal left chain A3a and the upper horizontal right chain A3b to run. The upper horizontal left drive double-chain wheel A51 and the upper horizontal right drive double-chain wheel A52 drive the left inclined conveying chain B1 and the right inclined conveying chain B2 to run, to finally enable the entire chain structure to run. Therefore, when the drive portion F forward runs, the lower horizontal left chain C2a, the lower horizontal right chain C2b, the left inclined conveying chain B1, the right inclined conveying chain B2, the upper horizontal left chain A3a, and the upper horizontal right chain A3b are driven to synchronously run forward. Referring to FIG. 22 to FIG. 24, a to-be-used steel belt is placed on the lower horizontal left chain C2a and the lower horizontal right chain C2b of the lower horizontal conveying portion C, and the lower horizontal left chain C2a and the lower horizontal right chain C2b synchronously run. Under friction of the lower horizontal chain common chain link C22 and driven by the lower horizontal chain special chain link C21, the steel belt runs forward to the left inclined conveying chain B1 and the right inclined conveying chain B2, and the left inclined special chain links B11 of the inclined conveying chain B1 and the right inclined conveying chain B2 push the steel belt to move upward to the upper horizontal conveying portion A. The upper horizontal chain special chain links A32 of the upper horizontal left chain A3a and the upper horizontal right chain A3b push the steel belt to move forward to a required position. With assistance of a scale A41, the driving motor F1 is operated to rotate forward and reversely to drive each chain to rotate forward and reversely, thereby driving the steel belt to move forward and backward, to reach a precise construction position.

The upper horizontal L-shaped limiting plate A44 plays a safety role, to prevent a W steel belt from exceeding a safe position and prevent the steel belt from causing personal injury due to dropping from a front portion.

The left inclined chain tensioning spring H13 of the left spring compressed chain tensioning apparatus H1 is a tension spring. Under pulling force of the left inclined chain tensioning spring H13, the left inclined chain tensioning rack H11 drives the left inclined chain tensioning wheel H12 to compress the left inclined conveying chain B1. The right inclined chain tensioning spring H23 of the right spring compressed chain tensioning apparatus H2 is a tension spring. Under pulling force of the right inclined chain tensioning spring H23, the right inclined chain tensioning rack H21 drives the right inclined chain tensioning wheel H22 to compress the right inclined conveying chain B2.

Referring to FIG. 1, the transporting and bolting machine is a type of tunneling support device with functions of transportation and anchor bolt support and protection, and is matched to a rear portion of a tunneling machine and a rear portion of a continuous miner. The transporting and bolting machine can implement support and protection of a roof and a side anchor bolt while cutting. A hopper at a front portion may take coal from a conveyor of the tunneling machine, and the coal is transported to a transshipment belt machine at a rear portion of the transporting and bolting machine by using the conveyor of the transporting and bolting machine. This embodiment provides a transporting and bolting machine, specifically including the steel belt conveying apparatus described above, a receiving hopper 11, a conveyor 12, a hopper adjustment cylinder 13, two jumbolters 14, two traveling mechanisms, and two installation platforms. An installation platform is disposed above each of the two traveling mechanisms, the two jumbolters 14 and the steel belt conveying apparatus are all fixed on the installation platform, and the receiving hopper 11 and the conveyor 12 are connected to each other as an integrated mechanism. The receiving hopper 11 and the conveyor 12 are both slidably connected to the installation platform and located between the two installation platforms. A cylinder tail of the hopper adjustment cylinder 13 is connected to the installation platform, and a piston rod of the hopper adjusting cylinder 13 is connected to the receiving hopper 11. Referring to FIG. 24, the tunneling machine or the continuous miner 2 cuts at the front portion, the transporting and bolting machine 1 closely follows the tunneling machine or the continuous miner 2, and coal output by the tunneling machine or the continuous miner 2 falls into the receiving hopper 11, and is transported by the conveyor 12 to a rear transshipment machine 3 for transporting out. In this manner, the tunneling machine or the continuous miner 2 may perform cutting while the anchor bolt is used at a rear portion. The receiving hopper 11 and the conveyor 12 are fixed. When the hopper adjustment cylinder 13 extends or contracts, the receiving hopper 11 and the conveyor 12 may be driven to perform adjustment within a certain distance, so that the transporting and bolting machine does not need to move when a position of the tunneling machine or the continuous miner 2 is adjusted, that is, the transporting and bolting machine can closely follow the tunneling machine or the continuous miner 2 to receive discharge.

In this embodiment, the steel belt conveying apparatus is installed on the transporting and bolting machine 1, to facilitate coordination working of the jumbolter 14 and the steel belt conveying apparatus. The jumbolter 14 can support and protect the steel belt conveyed by the steel belt conveying apparatus to a roadway roof. In FIG. 24, a mark 4 is a roof area of a roadway to be supported, and 5 is a roof area of a supported roadway. The steel belt conveying apparatus in this embodiment may also be applied to an anchor bolt drilling carriage.

The protection scope of the present invention includes but is not limited to the foregoing implementations. The protection scope of the present invention is subject to the claims. Any substitutions, modifications, and improvements that can be readily figured out by those skilled in the art fall into the protection scope of the present invention.

What is claimed is:

1. A steel belt conveying apparatus for a transporting and bolting machine, the steel belt conveying apparatus comprising an upper horizontal conveying portion, a left inclined conveying chain, a right inclined conveying chain, a lower horizontal conveying portion, a connecting rod frame, an inclined frame, a drive portion, and a height adjustment cylinder, wherein the upper horizontal conveying portion comprises an upper horizontal direction changing shaft, an upper horizontal left direction changing wheel, an upper horizontal right direction changing wheel, an upper horizontal left chain, an upper horizontal right chain, an upper horizontal frame, an upper horizontal left drive double-chain wheel, an upper horizontal right drive double-chain wheel, an upper horizontal drive shaft, and an upper horizontal drive chain wheel, one side of the upper horizontal frame is hingedly connected to the upper horizontal drive shaft, a left end of the upper horizontal drive shaft is fixedly connected to the upper horizontal left drive double-chain wheel, and a right end of the upper horizontal drive shaft is fixedly connected to the upper horizontal right drive double-chain wheel, the other side of the upper horizontal frame is horizontally and slidably connected to the upper horizontal direction changing shaft, a left end of the upper horizontal direction changing shaft is hingedly connected to the upper horizontal left direction changing wheel, and a right end of the upper horizontal direction changing shaft is hingedly connected to the upper horizontal right direction changing wheel, both the upper horizontal left direction changing wheel and the upper horizontal left drive double-chain wheel are meshed with the upper horizontal left chain, both the upper horizontal right direction changing wheel and the upper horizontal right drive double-chain wheel are meshed with the upper horizontal right chain, an intermediate portion of the upper horizontal drive shaft is fixedly connected to the upper horizontal drive chain wheel, the lower horizontal conveying portion comprises a lower frame, a lower horizontal left chain, a lower horizontal right chain, a lower horizontal drive shaft, a lower horizontal left drive double-chain wheel, a lower horizontal right drive double-chain wheel, a lower horizontal left direction changing chain wheel, a lower horizontal right direction changing chain wheel, and a lower horizontal direction changing shaft, one side of the lower frame is hingedly connected to the lower horizontal drive shaft, a left end of the lower horizontal drive shaft is fixedly connected to the lower horizontal left drive double-chain wheel, and a right end of the lower horizontal drive shaft is fixedly connected to the lower horizontal right drive double-chain wheel, the other side of the lower frame is horizontally and slidably connected to the lower horizontal direction changing shaft, a left end of the lower horizontal direction changing shaft is hingedly connected to the lower horizontal left direction changing chain wheel, and a right end of the lower horizontal direction changing shaft is hingedly connected to the lower horizontal right direction changing chain wheel, both the lower horizontal left drive double-chain wheel and the lower horizontal left direction changing chain wheel are meshed with the lower horizontal left chain, and both the lower horizontal right drive double-chain wheel and the lower horizontal right direction changing chain wheel are meshed with the lower horizontal right chain;

the left inclined conveying chain is separately meshed with the upper horizontal left drive double-chain wheel and the lower horizontal left drive double-chain wheel, the right inclined conveying chain is separately meshed with the upper horizontal right drive double-chain wheel and the lower horizontal right drive double-chain wheel, a top portion of the connecting rod frame is hingedly connected to the upper horizontal frame, and a bottom portion of the connecting rod frame is hingedly connected to the lower frame, a top portion of the inclined frame is hingedly connected to the upper horizontal drive shaft, and a bottom portion of the inclined frame is hingedly connected to the lower horizontal drive shaft;

the drive portion is fixed on the inclined frame and the drive portion is connected to the upper horizontal drive chain wheel, a cylinder tail of the height adjustment cylinder is hingedly connected to the inclined frame and a piston rod is hingedly connected to the connecting rod frame, and the lower frame is fixed on the transporting and bolting machine.

2. The steel belt conveying apparatus for a transporting and bolting machine according to claim 1, wherein the upper horizontal frame comprises an upper horizontal frame left longitudinal tube, an upper horizontal frame right longitudinal tube, an upper horizontal frame front horizontal tube, and an upper horizontal frame rear horizontal tube;

both a left end of the upper horizontal frame front horizontal tube and a left end of the upper horizontal frame rear horizontal tube are vertically connected to a side surface of the upper horizontal frame left longitudinal tube, both a right end of the upper horizontal frame front horizontal tube and a right end of the upper horizontal frame rear horizontal tube are vertically connected to a side surface of the upper horizontal frame right longitudinal tube, a front end of the upper horizontal frame left longitudinal tube is provided with an upper horizontal rack left front fork, and a rear end of the upper horizontal frame left longitudinal tube is provided with an upper horizontal rear left lug, a front end of the upper horizontal frame right longitudinal tube is provided with an upper horizontal rack right front fork, and a rear end of the upper horizontal frame right longitudinal tube is provided with an upper horizontal rear right lug, the upper horizontal drive shaft passes through the upper horizontal rear left lug and the upper horizontal rear right lug and is separately hingedly connected to the upper horizontal rear left lug and the upper horizontal rear right lug, an upper horizontal frame hinge lug is disposed on a rear side surface of the upper horizontal frame rear horizontal tube and is hingedly connected to the top portion of the connecting rod frame, an upper horizontal L-shaped limiting plate is disposed on a front side surface of the upper horizontal frame front horizontal tube, two upper horizontal direction changing shaft notches are provided on a surface of the upper horizontal direction changing shaft and are horizontally and slidably connected to the upper horizontal rack left front fork and the upper horizontal rack right front fork respectively, an upper chain spiral tensioning structure is disposed between the upper horizontal frame front horizontal tube and the upper horizontal direction changing shaft, and a scale is disposed on a side surface of the upper horizontal frame left longitudinal tube.

3. The steel belt conveying apparatus for a transporting and bolting machine according to claim 2, wherein the upper horizontal frame front horizontal tube is provided with an upper horizontal tensioning Installation hole, an upper horizontal direction changing shaft ring-shaped groove is provided on the surface of the upper horizontal direction changing shaft;

the upper chain spiral tensioning structure comprises a tensioning fork and a tensioning screw, a circle of a blocking protrusion is disposed on a surface of the tensioning screw and a tensioning screw tail cube is disposed at a tail end of the tensioning screw, the tail end of the tensioning screw is inserted into and passes through the upper horizontal tensioning installation hole, and the blocking protrusion blocks the tensioning screw from continuing passing through, a front end of the tensioning screw is threadedly connected to a tail end of the tensioning fork, a front end of the tensioning fork is inserted into the upper horizontal direction changing shaft ring-shaped groove, and the upper chain spiral tensioning structure is configured to implement tensioning of the upper horizontal left chain and the upper horizontal right chain.

4. The steel belt conveying apparatus for a transporting and bolting machine according to claim 3, wherein the lower frame comprises a lower frame front longitudinal tube, a lower frame front beam, a lower frame rear beam, a lower frame left longitudinal beam, and a lower frame right longitudinal beam;

both a left end of the lower frame front beam and a left end of the lower frame rear beam are vertically connected to a side surface of the lower frame left longitudinal beam, both a right end of the lower frame front beam and a right end of the lower frame rear beam are vertically connected to a side surface of the lower frame right longitudinal beam, a lower frame front lug is disposed at each of a front end of the lower frame left longitudinal beam and a front end of the lower frame right longitudinal beam, a lower frame rear slot seat is disposed at each of a rear end of the lower frame left longitudinal beam and a rear end of the lower frame right longitudinal beam, the lower frame front longitudinal tube is fixedly connected to a front side surface of the lower frame front beam, a front longitudinal tube hole is provided on the lower frame front longitudinal tube, the front longitudinal tube hole and a hole of the lower frame front lug are in a same vertical direction, a front longitudinal single lug is disposed at a front end of the lower frame front longitudinal tube, the lower horizontal drive shaft passes through the front longitudinal tube hole and the lower frame front lug, the lower horizontal drive shaft is separately hingedly connected to the lower frame front longitudinal tube and the lower frame front lug, the front longitudinal single lug is hingedly connected to a bottom portion of the connecting rod frame, two lower horizontal direction changing shaft notches are provided on a surface of the lower horizontal direction changing shaft and are horizontally and slidably connected to the lower frame rear slot seat separately, a lower chain spiral tensioning structure is disposed between the lower frame rear beam and the lower horizontal direction changing shaft, a lower frame tensioning installation hole is provided on a surface of the lower frame rear beam, a lower horizontal direction changing shaft ring-shaped groove is provided on the surface of the lower horizontal direction changing shaft, a structure of the lower chain spiral tensioning structure is the same as a structure of the upper chain spiral tensioning structure (A8), a tail end of the lower chain spiral tensioning structure is inserted into the lower frame tensioning installation hole and a front end of the lower chain spiral tensioning structure is inserted into the lower horizontal direction changing shaft ring-shaped groove, the lower chain spiral tensioning structure is configured to implement tensioning of the lower horizontal left chain and the lower horizontal right chain, each of the lower frame left longitudinal beam and the lower frame right longitudinal beam is connected to a seat by using a support rack, and the seat is fixed on the transporting and bolting machine.

5. The steel belt conveying apparatus for a transporting and bolting machine according to claim 4, wherein the connecting rod frame comprises three horizontal rods and two vertical rods; the three horizontal rods and the two vertical rods are mutually combined to form a ladder shape, a connecting rod frame upper lug is disposed at an upper end of each of the two vertical rods of the connecting rod frame, and a connecting rod frame lower lug is disposed at a lower end of each of the two vertical rods of the connecting rod frame; a connecting rod frame intermediate lug is disposed on a lower side surface of the horizontal rod in a middle portion of the connecting rod frame, a number of the upper horizontal frame hinge lug is two, the connecting rod frame upper lug is hingedly connected to the upper horizontal frame hinge lug, a number of the lower frame front longitudinal tube is two, the connecting rod frame lower lug is hingedly connected to the front longitudinal single lug at the front end of the lower frame front longitudinal tube, and the connecting rod frame intermediate lug is hingedly connected to the piston rod of the height adjustment cylinder.

6. The steel belt conveying apparatus for a transporting and bolting machine according to claim 4, wherein the inclined frame comprises a left vertical rod and a right vertical rod;

a lower horizontal rod and an upper horizontal rod are vertically connected between the left vertical rod and the right vertical rod, the lower horizontal rod is located at a lower middle portion of the left vertical rod and the right vertical rod, the upper horizontal rod is located at a upper middle portion of the left vertical rod and the right vertical rod, an inclined frame upper opening is provided at each of upper ends of the left vertical rod and the right vertical rod, and an inclined frame lower opening is provided at each of lower ends of the left vertical rod and the right vertical rod, the inclined frame upper opening is sleeved on the upper horizontal drive shaft and is hingedly connected to the upper horizontal drive shaft, the inclined frame lower opening is sleeved on the lower horizontal drive shaft and is hingedly connected to the lower horizontal drive shaft, an inclined frame cylinder lug is disposed on an upper side surface of the lower horizontal rod and is hingedly connected to the cylinder tail of the height adjustment cylinder, an inclined frame left half ring and an inclined frame left tensioning lug are disposed on a back surface of the left vertical rod, the inclined frame left half ring is located above the inclined frame left tensioning lug, an inclined frame right half ring and an inclined frame right tensioning lug are disposed on a back surface of the right vertical rod, the inclined frame right half ring is located above the inclined frame right tensioning lug, the inclined frame left half ring and the inclined frame left tensioning lug are connected to a left spring compressed chain tensioning apparatus, and the inclined frame right half ring and the inclined frame right tensioning lug are connected to a right spring compressed chain tensioning apparatus.

7. The steel belt conveying apparatus for a transporting and bolting machine according to claim 6, wherein the left spring compressed chain tensioning apparatus comprises a left inclined chain tensioning rack, a left inclined chain tensioning wheel, and a left inclined chain tensioning spring;

the left inclined chain tensioning rack is hooked to one end of the left inclined chain tensioning spring by using a left inclined tensioning rack ring, the other end of the left inclined chain tensioning spring is hooked to the inclined frame left half ring, the left inclined chain tensioning rack is hingedly connected to the inclined frame left tensioning lug by using an inclined tensioning rack single lug, the left inclined chain tensioning rack is hingedly connected to the left inclined chain tensioning wheel by using a left inclined tensioning rack double lug, and the left inclined chain tensioning rack is configured to drive, under pulling force of the left inclined chain tensioning spring, the left inclined chain tensioning wheel to compress the left inclined conveying chain;

the right spring compressed chain tensioning apparatus comprises a right inclined chain tensioning rack, a right inclined chain tensioning wheel, and a right inclined chain tensioning spring;

the right inclined chain tensioning rack (H21) is hooked to one end of the right inclined chain tensioning spring by using a right inclined tensioning rack ring, the other end of the right inclined chain tensioning spring is hooked to the inclined frame right half ring, the right inclined chain tensioning rack is hingedly connected to the inclined frame right tensioning lug by using a right inclined tensioning rack single lug, the right inclined chain tensioning rack is hingedly connected to the right inclined chain tensioning wheel by using a right inclined tensioning rack double lug, and the right inclined chain tensioning rack is configured to drive, under pulling force of the right inclined chain tensioning spring, the right inclined chain tensioning wheel to compress the right inclined conveying chain.

8. The steel belt conveying apparatus for a transporting and bolting machine according to claim 6, wherein a connecting base is installed on a back surface of the upper horizontal rod, the drive portion comprises a driving motor, a first connecting piece (F2), a reducer, a driving chain, a driving wheel, a second connecting piece, and a rotating shaft (F8);

the first connecting piece comprises a first connecting rack and a first coupling, the first connecting rack is a hollow structure and the first coupling is located inside the first connecting rack, a housing of the driving motor is fixedly connected to a housing of the reducer by using the first connecting rack, and an output shaft of the driving motor is connected to an input shaft of the reducer by using the first coupling located inside the first connecting rack;

the second connecting piece comprises a second connecting rack and a second coupling, the second connecting rack is a hollow structure and the second coupling is located inside the second connecting rack, a housing of the reducer is fixedly connected to the connecting base by using the second connecting rack, an output shaft of the reducer is connected to the rotating shaft by using the second coupling inside the second connecting rack, the rotating shaft is connected to the driving wheel, the rotating shaft is rotatably connected to the connecting base, and the driving chain is separately meshed with the driving wheel and the upper horizontal drive chain wheel.

9. The steel belt conveying apparatus for a transporting and bolting machine according to claim 6, wherein each of the upper horizontal left chain and the upper horizontal right chain is formed by mutually hingedly connecting a plurality of upper horizontal chain common chain links and a plurality of upper horizontal chain special chain links distributed at intervals;

the upper horizontal chain special chain link comprises two horizontal special outer chain plates and a horizontal special chain link column, the horizontal special outer chain plate is formed by mutually connecting a horizontal special outer chain plate basic portion and a horizontal special outer chain plate extension portion, the horizontal special outer chain plate basic portion and the horizontal special outer chain plate extension portion are of an integrated structure, two horizontal special outer chain plate extension portions are connected by using the horizontal special chain link column, the two horizontal special outer chain plate basic portions are connected by using two pin shafts, upper horizontal chain special chain links are evenly distributed on the upper horizontal left chain and the upper horizontal right chain, and the upper horizontal chain special chain link on the upper horizontal left chain and the upper horizontal chain special chain link on the upper horizontal right chain are symmetrically arranged;

each of the left inclined conveying chain and the right inclined conveying chain is formed by mutually hingedly connecting a plurality of inclined common chain links and a plurality of inclined special chain links distributed at intervals;

the inclined special chain link comprises an inclined special chain link parallel extension portion, an inclined special chain link vertical extension portion, and two inclined special chain link basic portions;

the two inclined special chain link basic portions are connected by using two pin shafts; the inclined special chain link basic portions, the inclined special chain link vertical extension portion, and the inclined special chain link parallel extension portion that are located on an outer side of the inclined special chain link are sequentially connected and are of an integrated structure, inclined special chain links are evenly distributed on the left inclined conveying chain and the right inclined conveying chain, and the inclined special chain link on the left inclined conveying chain and the inclined special chain link on the right inclined conveying chain are symmetrically arranged;

each of the lower horizontal left chain and the lower horizontal right chain is formed by mutually hingedly connecting a plurality of lower horizontal chain common chain links and a plurality of lower horizontal chain special chain links distributed at intervals;

a structure of the lower horizontal chain special chain link is the same as a structure of the upper horizontal chain special chain link, lower horizontal chain special chain links are evenly distributed on the lower horizontal left chain and the lower horizontal right chain, and the lower horizontal chain special chain link on the lower horizontal left chain and the lower horizontal chain special chain link on the lower horizontal right chain are symmetrically arranged.

10. A transporting and bolting machine, comprising the steel belt conveying apparatus according to claim 1, a jumbolter, and an installation platform, wherein both the steel belt conveying apparatus and the jumbolter are fixed on the installation platform.

\* \* \* \* \*